(12) United States Patent
Kushibiki et al.

(10) Patent No.: US 7,157,170 B2
(45) Date of Patent: Jan. 2, 2007

(54) ELECTRIC POWER GENERATING APPARATUS AND RELATED METHOD

(75) Inventors: Keiko Kushibiki, Fujisawa (JP); Dong Song, Yokohama (JP); Noboru Yamauchi, Yokohama (JP); Mitsugu Yamanaka, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 390 days.

(21) Appl. No.: 10/637,692

(22) Filed: Aug. 11, 2003

(65) Prior Publication Data

US 2004/0038095 A1 Feb. 26, 2004

(30) Foreign Application Priority Data

Aug. 23, 2002 (JP) ............................. 2002-243114

(51) Int. Cl.
*H01M 8/04* (2006.01)
*H01M 8/18* (2006.01)
*H01M 8/00* (2006.01)

(52) U.S. Cl. ..................... 429/26; 429/20; 429/24; 429/13

(58) Field of Classification Search .................. 429/26, 429/24, 22, 13, 20
See application file for complete search history.

(56) References Cited

U.S. PATENT DOCUMENTS

| 4,640,873 A | * | 2/1987 | Tajima et al. ............... 429/24 |
| 4,642,273 A | * | 2/1987 | Sasaki ......................... 429/22 |
| 4,670,359 A | * | 6/1987 | Beshty et al. ................ 429/17 |
| 4,917,971 A | * | 4/1990 | Farooque ..................... 429/19 |
| 5,019,463 A | | 5/1991 | Matsubara et al. ........... 429/12 |
| 5,482,790 A | | 1/1996 | Yamada et al. ............... 429/9 |
| 5,837,393 A | | 11/1998 | Okamoto ..................... 429/20 |
| 6,306,532 B1 | | 10/2001 | Kurita et al. ................. 429/20 |

FOREIGN PATENT DOCUMENTS

| EP | 1 047 144 A1 | 10/2000 |
| GB | 2 348 315 A | 9/2000 |
| JP | 9-237635 A | 9/1997 |
| JP | 2000-306592 A | 11/2000 |

* cited by examiner

*Primary Examiner*—Patrick Joseph Ryan
*Assistant Examiner*—Thomas H. Parsons
(74) *Attorney, Agent, or Firm*—Foley & Lardner LLP

(57) ABSTRACT

An electric power generating apparatus is provided with a fuel gas supply, an air supply source, an external reformer having a reformer section supplied with the fuel gas, a fuel cell stack, a heat exchanger section disposed to the external reformer, and an exhaust gas combusting section. The fuel cell stack has an electric power generating cell section, which is supplied with the fuel gas that results from the reformer section. The heat exchanger section achieves heat exchange between the air and the reformer section. The exhaust gas combusting section permits unburned fuel gas, which is supplied from the electric power generating cell section, and the air to be mixed and combusted to achieve heat exchange with respect to the fuel cell stack.

17 Claims, 10 Drawing Sheets

ELECTRIC POWER GENERATING APPARATUS AND RELATED METHOD

BACKGROUND OF THE INVENTION

The present invention relates to an electric power generating apparatus and a method and, more particularly, to an electric power generating apparatus, which is provided with an external reformer having a reformer section and a fuel cell stack having an electric power generating cell section formed with a plurality of cell plates and separators that are alternately laminated, and its related method.

Japanese Patent Application Laid-Open Publication No. 9-237635 discloses an electric power generating apparatus including a high temperature-type steam reformer and an internal reforming-type fuel cell, with a low temperature-type reformer being disposed upstream of fuel gas of the high temperature-type steam reformer. Even if the ratio of S/F between steam S and fuel F to be introduced into the system is low, such a structure restricts a fuel electrode layer of the fuel cell from being deposited with carbon, thereby improving the electric power generating efficiency.

Japanese Patent Application Laid-Open Publication No. 2000-306592 discloses an electric power generating apparatus equipped with a solid oxide-type fuel cell, a reformer, an air pre-heater and a heat recovery unit. Such a structure is intended to improve a total operating efficiency in a cogeneration system (waste heat power plant) to provide heat and electricity.

EP1047144A1 relates to a hybrid-type electric power generation system equipped with a quick start-up reformer, an engine which doubles as a reformer, and a solid oxide-type fuel cell adapted to generate electric power with exhaust gases of the engine.

SUMMARY OF THE INVENTION

However, according to studies made by the present inventors, even though the electric power generating apparatus disclosed in Japanese Patent Application Laid-Open Publication No. 9-237635 is able to generate electric power at a high efficiency even in the presence of a decrease in a steam amount ratio in a case where, under a condition in which the temperature of the fuel cell rises to a value suitable for electric power generation, the fuel cell is operated at a constant temperature and at a constant electric power output, it is conceivable that a difficulty is encountered in controlling an operating status in accordance with such a situation. These difficulties may be encountered where start-ups and stoppages relatively frequently take place or where fluctuation occurs in the temperature of the fuel cell followed by load variations like in an electric power generating apparatus installed on a moving object, such as an automobile.

Further, with the electric power generating apparatus disclosed in Japanese Patent Application Laid-Open Publication No. 2000-306592, similarly, it is conceivable that a difficulty is encountered in controlling operation in compliance with status variation.

Furthermore, with the electric power generating system disclosed in EP 1047144A1, even though it is intended to improve a start-up property, the electric power output is liable to fluctuate in a case of occurrence of large load variation subsequent to a state in which electric power can generate and, hence, it is conceivable that, if the electric power is controlled to be turned on or turned off, the temperature of the solid oxide-type fuel cell fluctuates followed by such turning on or turning off operations to cause variation in an electric power generating efficiency depending on the temperature fluctuation.

Moreover, during start-up, in a case where the stack temperature of the solid oxide-type fuel cell is not raised to the temperature available for electric power generation, there is a need for the stack to be heated. Meanwhile, if a demanded electric power output is large, although heat accordingly increases in the stack per se to cause the temperature to increase, the presence of the stack temperature raised to a level in close proximity to a durability upper limit temperature needs the electric power to be generated while cooling the stack and, so, there is a need for satisfying such a requirement.

The present invention has been completed upon the above studies being undertaken by the present inventors and has an object to provide an electric power generating apparatus and its related method which are able to retain a gas reformer and a fuel cell stack at constant temperatures to allow an electric power output to be simply and rapidly controlled to enable electric power control at a favorable response speed even in a case of using hydrocarbon fuel such as natural gas or gasoline.

That is, as a result of diligent studies undertaken by the present inventors, it is found out that provision of an air heat exchanger section in an external reformer while providing an exhaust gas combusting section in a fuel cell stack enables an electric power output to be simply and rapidly controlled and, hence, the present invention has been completed.

To achieve such an object, an electric power generating apparatus of one aspect of the present invention comprises: a fuel gas supply source supplying fuel gas; an air supply source supplying air; an external reformer having a reformer section supplied with the fuel gas; a fuel cell stack having an electric power generating cell section supplied with the fuel gas resulting by reforming in the reformer section of the external reformer; a heat exchanger section disposed to the external reformer to achieve heat exchange between the air supplied from the air supply source and the reformer section to allow the air, passing through the heat exchanger section, to be supplied to the fuel cell stack to perform heat exchange between the air and the fuel cell stack; and an exhaust gas combusting section disposed to the fuel cell stack to permit unburned fuel gas, supplied from the electric power generating cell section, and the air, supplied from the air supply source, to be mixed and combusted to achieve heat exchange with respect to the fuel cell stack.

Stated another way, an electric power generating apparatus of another aspect of the present invention comprises: fuel gas supplying means for supplying fuel gas; air supplying means for supplying air; an external reformer having a reformer section reforming the fuel gas supplied from the fuel gas supplying means; a fuel cell stack having an electric power generating cell section supplied with the fuel gas reformed in the reformer section of the external reformer; reformer section temperature detecting means for detecting the temperature of the reformer section of the external reformer; electric power generating cell detecting means for detecting the temperature of the electric power generating cell section of the fuel cell stack; and controlling means, responsive to the temperature of the reformer section detected by the reformer section temperature detecting means, the temperature of the electric power generating cell section detected by the electric power generating cell detecting means and an electric power generating status of the electric power generating cell section, for controlling amounts of the fuel gas, the air and the water to be introduced into the external reformer and controlling amounts of the air and water to be introduced into the fuel cell stack in order to execute at least one of heating, cooling and retaining the external reformer and the fuel cell stack, respectively, at constant temperatures.

Meanwhile, according to another aspect of the present invention, there is provided a method of controlling an electric power generating apparatus including a fuel gas supply source supplying fuel gas, an air supply source supplying air, an external reformer having a reformer section supplied with the fuel gas, and a fuel cell stack having an electric power generating cell section supplied with the fuel gas reformed by the reformer section of the external reformer, the method comprises: achieving heat exchange between air supplied from the air supply source and the reformer section of the external reformer; supplying the air, subjected to heat exchange made with respect to the reformer section of the external reformer, into the fuel cell stack to perform heat exchange with respect to the fuel cell stack; and mixing the air, supplied from the air supply source, with unburned fuel gas from the electric power generating cell section of the fuel cell stack to combust the unburned fuel gas and achieving heat exchange with respect to the fuel cell stack.

Other and further features, advantages, and benefits of the present invention will become more apparent from the following description taken in conjunction with the following drawings.

DETAILED DESCRIPTION OF THE PREFERRED EMBODIMENTS

Hereinafter, electric power generator apparatuses and related methods of respective embodiments of the present invention are described in detail with suitable reference to the accompanying drawings.

(First Embodiment)

Figure 1:
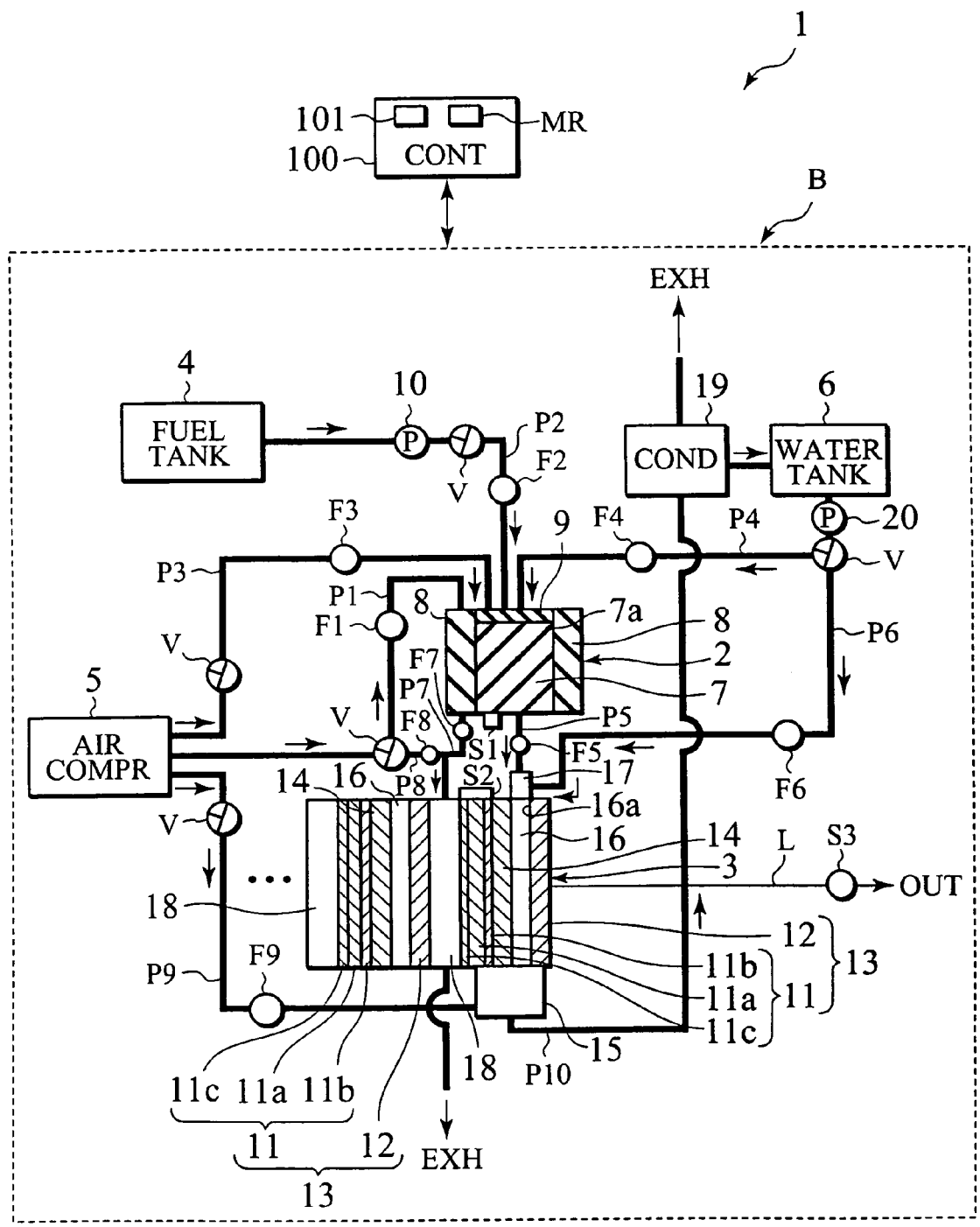
FIG. 1 is a view illustrating a structure of an electric power generating apparatus of a first embodiment according to the present invention.
Figure 2A:
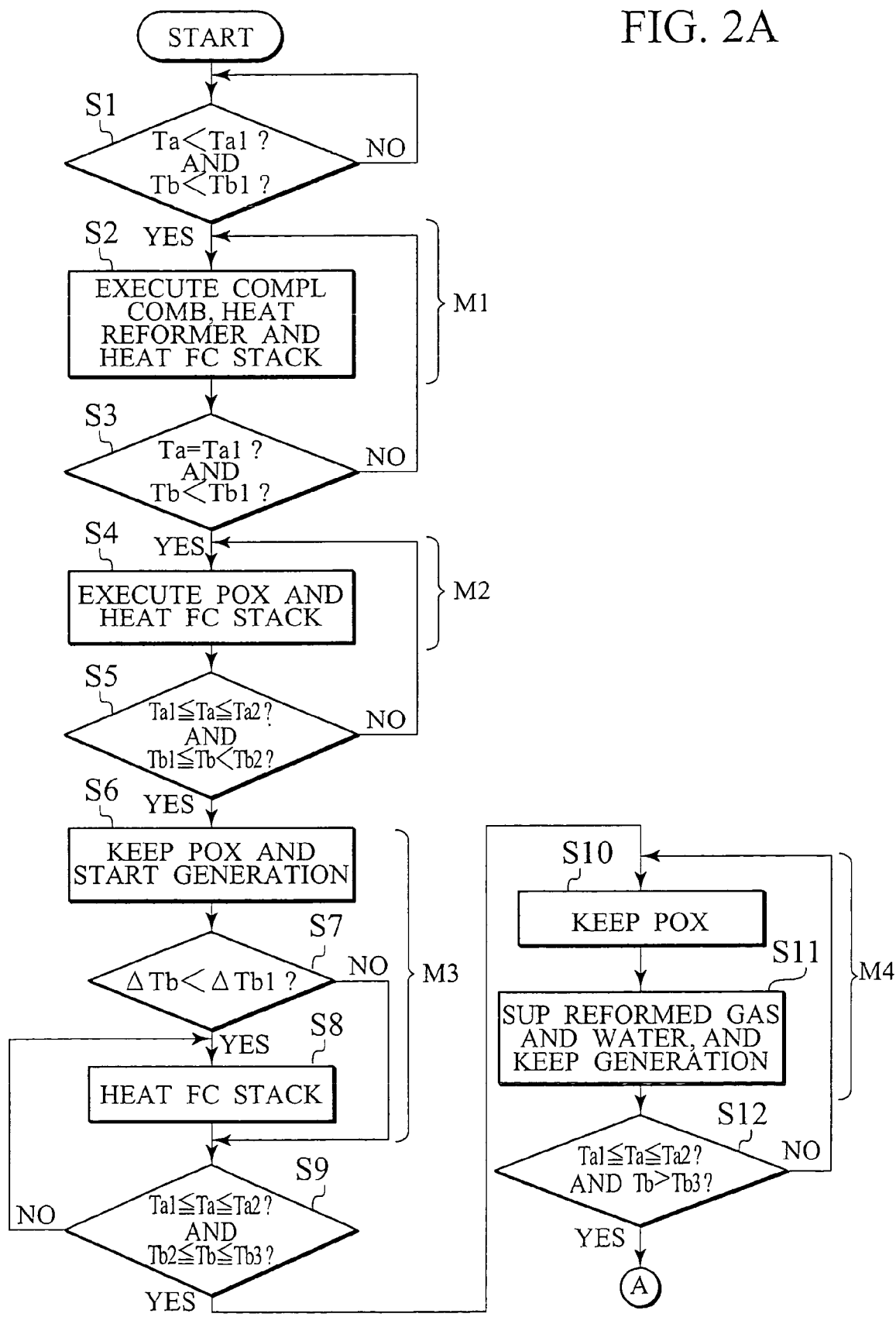
FIGS. 2A and 2B are flowcharts illustrating gas control of the electric power generating apparatus shown in FIG. 1 of the present embodiment.
Figure 2B:
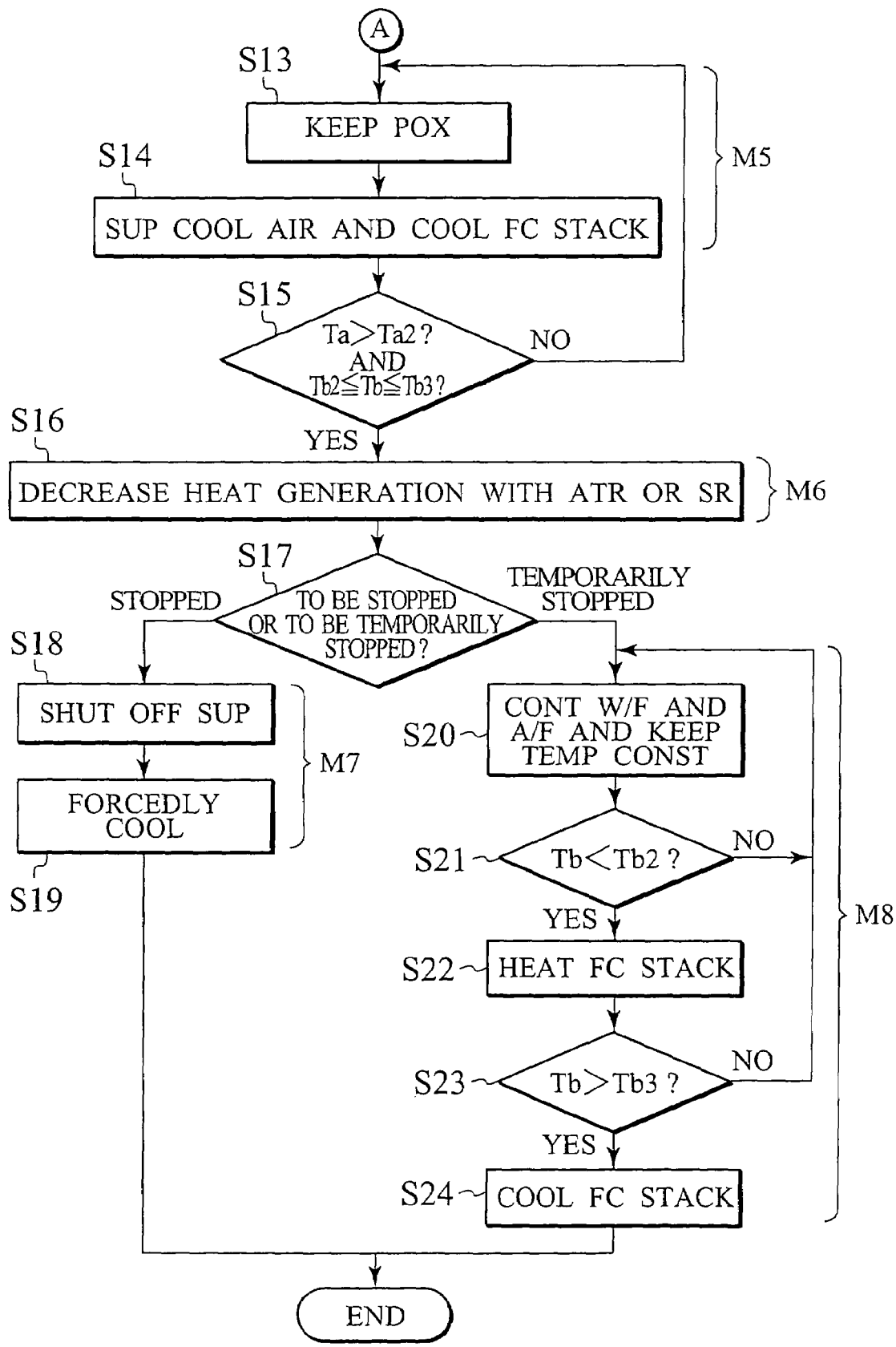

First, an electric power generating apparatus and its related method of a first embodiment according to the present invention are described in detail in conjunction with FIGS. 1 to 2B.

FIG. 1 is a view illustrating a structure of the electric power generating apparatus of the presently filed embodiment.

As shown in FIG. 1, the electric power generating apparatus 1 is comprised of an external reformer 2, a fuel cell stack 3, a fuel tank (a fuel gas supply source) 4, an air compressor (an air supply source) 5, and a water supply tank (a water supply source) 6.

The external reformer 2 takes the form of a double-tube structure that includes a reformer section 7 filled with a catalytic carrier body, formed of metals or ceramics, carrying thereon catalysts, and a heat-exchanger section 8 surrounding a periphery of the reformer section 7 about a center thereof. Additionally, the reformer 2 includes a mixing and vaporizing section 9 which is disposed at a fuel gas inlet port 7a of the reformer section 7 and which is connected to the fuel tank 4, the air compressor 5 and the water supply tank 6 though a sum of three delivery pipes P2, P3 and P4.

In the external reformer 2, air is introduced into the heat-exchanger section 8 from the air compressor 5 via the delivery pipe P1. Also, fuel gas supplied by a pump 10 during operation thereof from the fuel tank 4 is mixed with air supplied from the air compressor 5 and water (steam) supplied from the water supply tank 6 caused by operation of the pump 20 for vaporization whereupon combustion reaction or reforming reaction takes place in the reformer section 7.

Meanwhile, a fuel cell stack 3 is comprised of an electric power generating cell section 13 each composed of a plurality of cell plates 11, each formed of a cell including an electrolyte layer 11a, also serving as a gas partition wall, on both sides of which are formed with a fuel electrode layer 11b and an air electrode layer 11c, and separator plates 12 that are alternately laminated. Moreover, the fuel cell stack 3 is comprised of an internal reformer section 14 formed of a reformer catalyst layer laminated on the fuel electrode 11b of the electric power generating cell section 13, an exhaust gas combusting section 15, disposed in a downstream side of the stack at an area where the electric power generating cell section 13 and the internal reformer section 14 are laminated, to which a delivery pipe P9 extending from the air compressor 5 is connected, and a fuel gas passage 16 that supplies fuel gas to the internal reformer section 14. In addition, the exhaust gases combusting section 15 serves to substantially and completely combust exhaust of the fuel cell stack 3 and is charged with a catalytic carrier body made from metal or ceramic.

Further, the fuel cell stack 3 is comprised of a mixing and vaporizing section 17 disposed at an inlet port 16a of the fuel gas supply 16 and connected to both of a fuel supply delivery pipe P5 extending from the reformer section 7 of the external reformer 2 and a water (steam) supply delivery pipe P6 extending from the water supply tank 6, and an air passage 18 disposed in contact with the air electrode layer 11c of the electric power generating cell section 13 and to which both a delivery pipe P7 leading from the heat exchanger section 8 of the external reformer 2 and a delivery pipe P8 extending from the air compressor 5 are integrally connected. Also, the number of laminated component elements, such as the electric power generating cell sections 13, is not limited to a particular value and may be determined as occasion demands. Moreover, the supply lines of fuel gas, air and water (steam), to be delivered to the respective electric power generating cell sections 13, may be connected to the respective electric power generating cell sections 13 or may take a structure wherein these supply lines are connected to one of the electric power generating cell sections 13 from which fuel, air and water (steam) may be supplied to the other remaining electric power generating cell section 13 in sequence.

In the fuel cell stack 3, allowing fuel gas, introduced through the mixing and vaporizing section 17, to pass through the reformer catalytic layer forming the internal reformer section 14 as the reformer catalyst layer compels steam reforming to take place depending on the amount of steam, with resulting reformed gas arriving at the fuel electrode layers 11b of the electric power generating cell sections 13 to react with oxygen ions transferred through the electrolyte layers 11a to form $CO_2$ and $H_2O$. Additionally, oxygen in the air supplied to the air flow passage 18 through a unified structure, to which the delivery pipe P7 leading from the heat exchanger section 8 of the external reformer 2 and the delivery pipe P8 leading from the air compressor 5 are connected, is consumed in the air electrode layers 11c of the electric power generating cell sections 13, with resulting air exhaust being expelled to the outside of the system. Here, the air flow passage 18 of the electric power generating cell section 13 is determined so as to enable air to flow at a larger flow rate than that required for achieving electric power generation and, thus, the air flow passage 18 doubles as a coolant gas flow passage, thereby enabling the air flow passage 18 to have a capability of cooling the fuel cell stack 3.

Further, in the fuel cell stack 3, the exhaust gas combusting section 15 is supplied with exhaust of fuel gas expelled from the stack portions and new air introduced from the air compressor 5 via the delivery pipe P9, thereby substantially and completely combusting unburned fuel gas, which is not used in electric power generation at the electric power generating cell sections 13 to allow exhaust gases to be expelled to a delivery pipe P10 of a condenser 19. Then, exhaust gases expelled from the exhaust gas combusting section 15 of the fuel cell stack 3 is cooled in the condenser 19, with steam component being liquefied and returned to the water supply tank 6.

Further, disposed in the delivery pipes P1 to P4 connected to the external reformer 2 and the delivery pipes P5 to P9 connected to the fuel cell stack 3, respectively, are switching valves V that have opening and closing capabilities.

Furthermore, mounted on the reformer section 7 of the external reformer 2 is a temperature detector S1 that detects the temperature of the reformer section 7. Mounted on the electric power generating cell section 13 of the fuel cell stack 3 is a temperature detector S2 that detects the temperature of the electric power generating cell section 13, and connected to an output line L extending from the fuel cell stack 3 is an electric power output status detector S3 that detects whether the electric power generating cell section 13 is in operation and detects the magnitude of resulting electric power output. Also, the temperature detectors S1, S2 may be comprised of thermocouples, respectively, and the electric power output status detector S3 may be comprised of a Voltmeter or an Ammeter.

Also, connected to the delivery pipes P1 to P9, respectively, are flow meters F1 to F9 that detect the flow rates of fluid flowing through the respective delivery pipes.

Moreover, in the electric power generating apparatus 1 of the presently filed embodiment, the exhaust gas combusting section 15 of the fuel cell stack 3 may incorporate an igniter or a catalyst for purifying exhaust gases.

In addition, locating the exhaust gas combusting section not only on the fuel cell stack 3 but also on the external reformer 2 enables the external reformer and the fuel cell stack to be heated and heat reserved.

Further, a concrete structure, in which the internal reformer section is disposed in close proximity to the electric power generating section 13 inside the fuel cell stack 3, may take the form of not only a construction in that the reformer catalyst layer is formed on the fuel electrode layer but also a construction wherein a porous flow passage, carrying an internal catalyst, is formed in the fuel gas flow passage at an area upstream of the electric power generating cell section.

Furthermore, the condenser 19 may take the form of not only an air cooled structure utilizing atmospheric air but also a structure that is arranged to allow the air supply pipe, by which the air compressor and the air flow passage of the electric power generating cell section of the fuel cell stack are connected, to extend through the condenser to simultaneously enable preheating of the air stream for electric power generation and cooling of the condenser.

By the way, the component parts set forth above forms a main body section B of the electric power generating apparatus 1 and the component parts of the main body section B are appropriately controlled by a controller 100 to which output signals delivered from the detectors S1 to S3 and the flow meters F1 to F9 of the main body section B are inputted. The controller 100 includes a computation processing section 101 that is responsive to the output signals from the detectors S1 to S3 and the flow meters F1 to F9 and executes a computing operation using these output signals suitably as needed. Also, the controller 100 includes a memory MR that stores data necessary for such a computing operation.

In particular, the computation processing section 101 of the controller 100 is able to compute a varying degree of the temperature of the electric power generating cell section 13 and a varying degree (involving a rise-up speed and stability) of the electric power output of the electric power generating cell section 13. The controller 100 is able to control various feed rates of fuel gas, air and steam to be introduced into the external reformer 2 in dependence on the varying degree of the temperature condition of the reformer section 7, the temperature condition of the electric power generating cell section 13 and the electric power generating status of the electric power generating cell section 13, respectively. Also simultaneously, the controller 100 is able to control various feed rates of air and steam to be introduced into the fuel cell stack 3 in dependence on the varying degree of the temperature condition of the reformer section 7, the temperature condition of the electric power generating cell section 13 and the electric power generating status of the electric power generating cell section 13, respectively.

Hereinafter, gas control to be controlled by the controller 100 in a series of sequential operations of the electric power generating apparatus 1 of the presently filed embodiment is described.

FIGS. 2A and 2B are flowcharts illustrating gas control of the electric power generating apparatus of the presently filed embodiment.

In FIGS. 2A and 2B, gas control of the presently filed embodiment typically includes a start up mode M1, a stack temperature rising mode M2, a stack temperature rising and electric power generation mode M3, a stack steady state electric power generation mode M4, a stack cooling and electric power generation mode M5, an external reformer cooling and electric power generation mode M6, a stop mode M7 and a temporary electric power temporary stop mode M8 as will be described below. Also, for convenience's sake of description, although a series of operations of such gas control is consecutively executed in sequence, it may be possible for the order of the operations to be appropriately altered as needed. Moreover, although during execution of the series of operations, the temperature of the reformer section 7 of the external reformer 2 and the temperature of the electric power generating cell section 13 of the fuel cell stack 3 are described hereinafter to be continuously measured and such temperatures are described to vary in pattern in which the temperatures progressively increase as the operations proceed, it is possible, of course, to perform the measurements of the temperatures in a discontinuous manner. Also the present invention is not limited to a particular varying pattern in temperature.

Start Up Mode M1

As shown in FIGS. 2A and 2B, in step S1, if the start up operation takes place wherein judgment is executed such that the temperature Ta of the reformer section 7 of the external reformer 2 is lower than the temperature Ta1, at which partially reforming reaction is able to begin, and the temperature Tb of the electric power generating cell section 13 of the fuel cell stack 3 is lower than the temperature Tb1 at which electric power generation is able to begin, flow is routed to step S2 to execute the operation of the start up mode M1. Conversely, in step S1, if no such conditions are satisfied, the operation in step S1 is continued and judgment in step S1 is performed until such conditions are satisfied. Of course, if such conditions are not satisfied in step S1, current operation may be interrupted or stopped as needed, or the operation may proceed to the subsequent electric power generation mode M3 or the like on the supposition that the external reformer 2 and the fuel cell stack 3 remain at high temperatures.

In consecutive step S2, in order for the external reformer 2 to be started up, fuel and air are introduced into the reformer section 7 of the external reformer 2 via the delivery pipes P2 and P3, respectively, to achieve completely combusting reaction. Thus, the reformer section 7 is heated up and, for the purpose of starting up the fuel cell stack 3, high temperature exhaust gases are introduced into the internal reformer section 14 and the electric power generating cell sections 13 from the outlet of the reformer section 7 via the delivery pipe P5, thereby heating up the internal reformer section 14 and, especially, the electric power generating cell sections 13 of the fuel cell stack 3. Also, during such operation, in order for the fuel cell stack 3 to be started up, air is introduced from the air compressor 5 to the heat exchanger section 8 of the external reformer 2 via the delivery pipe P1 to heat this air, with preheated air being introduced into the air flow passage 18 of the electric power generating cell sections 13 of the fuel cell stack 3 via the delivery pipe P7 for thereby heating especially the electric power generating cell sections 13 of the fuel cell stack 3.

Then, upon operation in step S2, flow proceeds to step S3 while heating the reformer section 7 and the electric power generating cell section 13.

Stack Temperature Rising Mode M2

In succeeding step S3, during the stack temperature rising mode in which it is judged that the temperature Ta of the reformer section 7 of the external reformer 2 reaches the temperature Ta1, at which partially reforming reaction (POX) is able to begin, and the temperature Tb of the electric power generating cell section 13 of the fuel cell stack 3 does not reach the temperature Tb1 at which electric power generation is able to begin, flow is routed to step S4 to execute the operation of the stack temperature rising mode M2. Conversely, in step S3, if no such conditions are satisfied, current operation may be interrupted or stopped as needed, or the operation may proceed to the subsequent electric power generation mode M3 or the like on the supposition that the external reformer 2 and the fuel cell stack 3 remain at the high temperatures.

In consecutive step S4, since the temperature Ta of the reformer section 7 of the external reformer 2 reaches the temperature Ta1 at which partially reforming reaction (POX) is able to begin, operation is executed to lower the ratio A/F between the flow rate F of fuel gas to be introduced into the reformer section 7 via the delivery pipe P2 and the flow rate A of air to be introduced into the reformer section 7 via the delivery pipe P3, thereby shifting operation to partially reforming reaction. This results in converting gas, introduced from the outlet of the reformer section 7 into the internal reformer section 14 of the fuel cell stack 3 via the delivery pipe P5, to be converted to $H_2$ gas and, in addition thereto, in forming partially reformed gas, containing low carbon molecules such as CO and $CH_4$, to form fuel of the fuel cell.

Further, in such step S4, since the temperature Tb of the electric power generating cell section 13 of the fuel cell stack 3 does not reach the temperature Tb1 at which electric power generation is able to begin, fuel gas supplied to the fuel cell stack 3 comes to be introduced into the exhaust gas combusting section 15 of the fuel cell stack 3 without being consumed in the electric power generating cell section 13, and air is introduced into the exhaust gas combusting section 15 from the air compressor 5 to combust such fuel gas. This results in further heating up the fuel cell stack 3. During such operation, air is introduced into the heat exchanger section 8 of the external reformer 2 from the air compressor 5 and is heated. This introduction of such preheated air into the air flow passage 18 of the electric power generating cell sections 13 of the fuel cell stack 3 allows the fuel cell stack 3 to be heated.

Then, in step S4, while permitting partially reforming reaction to occur in the external reformer 2 and heating the fuel cell stack 3, flow is routed to succeeding step S5.

Stack Temperature Rising and Electric Power Generation Mode M3

In succeeding step S5, during the stack temperature rising and electric power generation mode in which it is judged that the temperature Ta of the reformer section 7 of the external reformer 2 lies in a value equal to or greater than the temperature Ta1, at which partially reforming reaction mode is able to begin, and equal to or less than the durability upper limit temperature Ta2, and the temperature Tb of the electric power generating cell section 13 of the fuel cell stack 3 lies in a value equal to or greater than the temperature Tb1, at which electric power generation is able to begin, and less than a steady state electric power generation minimum temperature Tb2, flow is routed to step S6 to execute the operation of the stack temperature rising and electric power generation mode M3. Conversely, in step S5, if no such conditions are satisfied, flow is routed back to step S4 and judgment in step S5 is executed until such conditions are satisfied. Of course, if no such conditions are satisfied in step S3, current operation may be interrupted or stopped as needed, or operation may proceed to the subsequent stack steady state electric power generation mode M4 or the like on the supposition that the external reformer 2 and the fuel cell stack 3 remain at the high temperatures.

In consecutive step S6, the reformer section 7 of the external reformer 2 is continuously operated in the partially reforming reaction mode, while resulting partially reformed fuel gas is introduced into the fuel cell stack 3. Fuel gas introduced into the fuel cell stack 3 passes through the internal reformer section 14 and reaches the surfaces of the fuel electrode layers 11$b$ of the electric power generating cell section 13, thereby reacting with oxygen ions passing through and supplied through the electrolyte layer 11$a$ to achieve oxidizing reaction for thereby beginning electric power generation. The electric power output increases with an increase in the temperature Tb of the electric power generation cell section 13, accompanied by an increase in the amount of heat generation in the electric power generating cell section 13. Thus, as the electric power output increases depending on an increase in the temperature Tb of the electric power generating cell section 13, unburned fuel gas (with carbon containing gas components with no $CO_2$) in gases to be introduced into the exhaust gas combusting section 15 from the outlet of the electric power generating cell section 13 of the fuel cell stack 3 decreases.

Upon completion of operation in step S6, operation is routed to succeeding step S7 while permitting electric power generation to continue in the fuel cell stack 3.

In succeeding step S7, if it is judged that a temperature rising speed ΔTb is slow (ΔTb<ΔTb1: ΔTb1 is a given value), in consecutive step S8, the flow rate of fuel gas to be introduced into the reformer section 7 of the external reformer 2 is increased, thereby causing unburned fuel gas, which is not consumed in the electric power generating cell section 13 of the fuel cell stack 3, to increase. Resulting unburned fuel gas is combusted in the exhaust gas combusting section 15 of the fuel cell stack 3, thereby heating the fuel cell stack 3. During such operation, air is introduced from the compressor 5 into the heat exchanger section 8 of the external reformer 2 and is heated, with resulting preheated air being introduced into the electric power generating cell section 13 of the fuel cell stack 3 to heat the same.

Upon completion of operations in step S8, operation is routed to consecutive step S9. Also, in step S7, if it is judged that the temperature rising speed ΔTb is high (ΔTb≧ΔTb1), operation is directly routed to step S9 with no routing through step S8.

Stack Steady State Electric Power Generation Mode M4

In succeeding step S9, during the stack steady state electric power generation mode in which it is judged that the temperature Ta of the reformer section 7 of the external reformer 2 lies in a value equal to or greater than the temperature Ta1, at which partially reforming reaction mode is able to begin, and equal to or less than the durability upper limit temperature Ta2, and the temperature Tb of the electric power generating cell section 13 of the fuel cell stack 3 lies in a value equal to or greater than a steady state electric power generation minimum temperature Tb2 and equal to or less than a steady state electric power generation maximum temperature Tb3, flow is routed to step S10 to execute the operation of the stack steady state electric power generation mode M4. Conversely, in step S9, if no such conditions are satisfied, flow is routed back to step S8 and judgment in step S9 is executed until such conditions are satisfied. Of course, if no such conditions are satisfied in step S9, current operation may be interrupted or stopped as needed, or operation may proceed to the subsequent electric power generation mode M5 or the like on the supposition that the external reformer 2 and the fuel cell stack 3 remain at the high temperatures.

In consecutive step S10, the reformer section 7 of the external reformer 2 is consecutively operated in the partially reforming reaction mode, while continuously introducing resulting partially reformed fuel gas into the fuel cell stack 3.

In consecutive step S11, the internal reformer section 14 of the fuel cell stack 3 is supplied with, in addition to partially reformed fuel gas introduced from the outlet of the reformer section 7 of the external reformer 2, water (steam) from the water supply tank 6 for steam reforming (SR). Then, in the internal reformer section 14 of the fuel cell stack 3, steam reforming takes place to form fuel gas containing $H_2$ and CO by which an oxidizing reaction occurs in the fuel electrode layers 11b of the electric power generating cell sections 13 to generate the electric power output. Also, fuel gas, which is not consumed in the electric power generating cell section 13 and is caused to be expelled from the electric power generating cell section 13, is supplied to the exhaust gas combusting section 15 to which air is also introduced at a desired flow rate from the compressor 5 for achieving combustion. Here, the steam reforming reaction is an endothermic reaction, and both oxidizing reactions in the electric power generating cell section 13 and combustion in the exhaust gas combusting section 15 are exothermic reactions, wherein the internal reforming reaction is controlled through the regulation of the flow rate of steam to be introduced and, thus allowing the fuel cell stack 3 to be retained at a constant temperature for thereby achieving steady state electric power generation. During such operation, also, air is introduced into the heat exchanger section 8 of the external reformer 2 from the compressor 5 to heat air while removing heat, with preheated air being introduced into the air flow passage 18 of the electric power generating cell section 13 of the fuel cell stack 3, thereby heating the fuel cell stack 13.

That is, in the present mode, the external reformer 2 is typically operated in the partially reforming reaction mode (to be applied with heat), heat exchange takes place (to remove heat) in the heat exchanger section 8 and heat is externally dissipated to the outside (to remove heat), thus establishing a heat balance. Also, typically, the fuel cell stack 3 is supplied with reformed fuel gas (to be applied with heat) from the external reformer 2, achieves an internal reforming reaction (to remove heat) in the internal reformer section 14, achieves electric power generation (to be applied with heat), achieves exhaust gas combustion (to be applied with heat) in the exhaust gas combusting section 15, and discharges heat to the outside (to remove heat), thereby establishing the heat balance.

Upon completion of operations in steps S10 and S11, the external reformer 2 is continuously operated in the partially reforming reaction mode, and flow is routed to step S12 while retaining the fuel cell stack 13 at the constant temperature and achieving steady state electric power generation.

Stack Cooling and Electric Power Generation Mode M5

In succeeding step S12, during the stack cooling and electric power generation mode in which it is judged that the temperature Ta of the reformer section 7 of the external reformer 2 lies in the value equal to or greater than the temperature Ta1, at which partially reforming reaction mode is able to begin, and equal to or less than the durability upper limit temperature Ta2, and the temperature Tb of the electric power generating cell section 13 of the fuel cell stack 3 is greater than the steady state electric power generation maximum temperature Tb3, flow is routed to step S13 to execute the operation of the stack cooling and electric power generation mode M5. Conversely, in step S12, if no such conditions are satisfied, flow is routed back to step S10 and judgment in step S12 is executed until such conditions are satisfied. Of course, if no such conditions are satisfied in step S12, current operation may be interrupted or stopped as needed, or operation may proceed to a subsequent electric power generation mode M6 or the like on the supposition that the external reformer 2 and the fuel cell stack 3 remain at the high temperatures.

In subsequent step S13, the reformer section 7 of the external reformer 2 is continuously operated in the partially reforming reaction mode, while continuously introducing resulting partially reformed fuel gas into the fuel cell stack 3 to continuously allow the fuel cell stack 3 to generate the electric power output.

In consecutive step S14, air passing through the heat exchanger section 8 of the external reformer 2 to be preheated and supplied through the delivery pipe P7 is mixed with air, which is delivered from the compressor 5 through the delivery pipe P8 and is not preheated, and resulting mixed air is introduced into the electric power generating cell section 13 of the fuel cell stack 3. That is, by introducing air, lowered in temperature, to the electric power generating cell section 13 of the fuel cell stack 3 at an increased flow rate, the electric power generating cell section 13 is cooled while achieving electric power generation.

Upon completion of operation in step S14, the external reformer 2 is continuously operated in the partially reforming reaction mode, and flow is routed to step S15 while cooling the fuel cell stack 13 that achieves electric power generation.

External Reformer Cooling and Electric Power Generation Mode M6

In step S15, during the external reformer cooling electric power generation mode in which it is judged that the temperature Ta of the reformer section 7 of the external reformer 2 exceeds the partially reforming upper limit temperature Ta2, and the temperature Tb of the fuel cell stack 3 lies in the value equal to or greater than the steady state electric power generation minimum temperature Tb2 and equal to or less than the steady state electric power generation maximum temperature Tb3, flow is routed to step S16 to execute the operation of the reformer cooling electric power generation mode M6. Conversely, in step S15, if no such conditions are satisfied, flow is routed back to step S13 and judgment in step S15 is executed until such conditions are satisfied. Of course, if no such conditions are satisfied in step S15, current operation may be interrupted or stopped as needed, or operation may be proceeded to a subsequent stop mode M7 or the like.

In consecutive step S16, the reformer section 7 of the external reformer 2 is supplied with, in addition to fuel gas and air, water (steam) from the water supply pump 6 via the delivery pipe P4 to shift reaction of the reformer section 7 such that shift occurs from partially reforming reaction to auto-thermal reaction (ATR reaction) or steam reforming reaction to restrict heat generation in the reformer section 7. Here, the ATR reaction mode means a reaction mode that cause partially oxidizing reaction and steam reforming reaction to occur wherein since steam reforming reaction is endothermic reaction, the temperature rise in the reformer section 7 is restricted or lowered. For this reason, by controlling the ratio W/F of the amount (e.g., flow rate) W of water (steam) to be introduced in terms of the flow rate F of fuel gas and the ratio A/F of the flow rate A of air in terms of the flow rate F of fuel gas, it is possible for the temperature Ta of the reformer section 7 of the external reformer 2 to be regulated.

Upon completion of operation in step S16, while cooling the external reformer 2 and permitting the fuel cell stack 3 to generate the electric power output, flow proceeds to step S17 and, in step S17, operation is executed to judge whether the time is for stopping the electric power generating apparatus 1 or the time is for temporarily interrupting the electric power output of the electric power generating apparatus 1, and if judgment is made that the time is for stopping the electric power generating apparatus 1, flow is routed to step S18 to execute the stop mode M7 whereas if judgment is made that the time is for temporarily interrupting the electric power output of the electric power generating apparatus 1, flow is routed to step S20 to execute the electric power output temporary stop mode M8.

Stop Mode M7

First, when stopping the electric power generating apparatus 1, in step S18, operation is executed to shut off all of the fuel gas, the air and the water (steam), respectively, to be supplied to the reformer section 7 of the external reformer 2, and also to shut off the air, the fuel gas passing through the external reformer 2 and the water (steam), respectively, to be supplied to the fuel cell stack 3, thereby stopping the reaction accompanied by the heat generations of the external reformer 2 and the fuel cell stack 3. Here, the supply of air to the exhaust gas combusting section 15 of the fuel cell stack 3 is stopped when a predetermined time interval has elapsed after the supply of the fuel gas has been shut off. This enables residual fuel gas, which remains in the system and expelled to the outside with a certain time lag after shut-off of fuel gas, to combust whereupon the system is stopped. Also, it becomes possible to preclude the fuel cell stack 3 from being damaged due to a rapid temperature drop and to stop the fuel cell stack 3 upon purification of the exhaust gases. Of course, such steps may be executable subsequent to other control modes as needed.

Secondly, when it is required to implement forced cooling, in additionally succeeding step S18, air is directly introduced from the compressor 5 into the heat exchanger section 8 of the external reformer 2 and the fuel cell stack 3, thereby simultaneously cooling both these component parts.

In such a manner, upon completion of all steps stated above, the current series of operations are terminated.

Electric Power Output Temporary Stop Mode M8

Meanwhile, when temporarily stopping the electric power output of the electric power generating apparatus 1, first in step S20, by controlling the ratio W/F between the amount W of water (steam) to be introduced and the flow rate F of fuel gas to be introduced into the reformer section 7 of the external reformer 2 and the ratio A/F between the flow rate A of air and the flow rate F of fuel gas while appropriately controlling the air, the fuel gas that passes through the external reformer 2, and the water (steam), respectively, to be supplied to the fuel cell stack 3, the partially reforming reaction mode, the ATR reaction mode and the steam reforming mode are controlled, thereby keeping the temperature of the external reformer 2 constant. Also, ON/OFF time intervals, when in achieving electric power generation with ON/OFF control of the electric power output, are determined based on a moving object on which the present electric power generating apparatus 1 is installed, such as a power load condition of a vehicle and a capacity of a storage battery installed on the vehicle. Of course, such a step can be applied to execute subsequent to the other control modes as needed.

In succeeding step S21, if it is judged that the temperature Tb of the electric power generating cell section 13 drops below the steady state electric power generating minimum temperature Tb2 followed by shut-off of the electric power output, in consecutive step S22, like in step S8, the flow rate of fuel gas to be introduced into the reformer section 7 of the external reformer 2 is increased and the flow rate of air to be introduced into the exhaust gas combusting section 15 of the fuel cell stack 3 is also increased for thereby promoting combustion to heat the fuel cell stack 3 and, upon completion of operation in step S22, flow is routed to step S23. On the contrary, in step S21, if it is judged that the temperature Tb of the electric power generating cell section 13 does not drop below the steady state electric power generating minimum temperature Tb2 followed by shut-off of the electric power output, flow is routed back to step S20 to keep the temperature of the external reformer 2 constant while appropriately controlling air, fuel gas, passing through the external reformer 2, and water (steam) respectively to be supplied to the fuel cell stack 3.

In consecutive step S23, if it is judged that the temperature Tb of the electric power generating cell section 13 exceeds the steady state electric power generating maximum temperature Tb3, then in consecutive step S24, the temperature of the electric power generating cell section 13 is lowered by mixing non-preheated air from the air compressor 5 as in step S14 to allow mixed air to be introduced into the electric power generating cell section 13 of the fuel cell stack 3, and upon completion of operation in step S23, the current series of operations are terminated. Of course, it is not objectionable for operation not to be terminated at this stage, and flow may be further routed back to step S20, if desired, to continue the electric power output temporary stop mode M8. In contrast, in step S23, if it is judged that the temperature Tb of the electric power generating cell section 13 does not exceed the steady state electric power generating maximum temperature Tb3, flow is routed back to step S20.

Also, in the present mode, it may be possible for air to be introduced into the electric power generating cell section 13 of the fuel cell stack 3 for electric power generation to be shut off upon detection of the turned-off state of the electric power output. Of course, in order for the temperature variation to be limited, it may be possible to control so as to continue flow of air at a constant flow rate.

As set forth above, with the structure of the presently filed embodiment, the reformer section of the external reformer is located upstream of the fuel flow passage of the fuel cell stack and has a function to combust or reform fuel gas. Then, by introducing fuel gas, air and water (steam) into the reformer section and controlling the ratio A/F and the ratio W/F of the air flow rate A and the water flow rate W in terms of the fuel gas flow rate, respectively, it becomes possible to control any of complete combustion reaction, partially reforming reaction, steam reforming reaction and ATR reaction.

Here, although complete combustion reaction is exothermic reaction with exhaust gases emitted from the reformer section having high concentration of $CO_2$ and $H_2O$ and does not form fuel gas for the fuel cell stack located downstream of the fuel flow passage, the high temperature exhaust gases may be introduced into the fuel cell stack to heat the same. Also, partially oxidizing reaction forms fuel reforming reaction in the form of exothermic reaction with the exhaust gases from the reformer section containing CO and $H_2$ that can form fuel gas for the fuel cell stack. Moreover, steam reforming reaction is fuel reforming reaction in the form of endothermic reaction with the exhaust gases from the reformer section being similarly able to contain CO and $H_2$. Additionally, ATR reaction is operative to allow partially reforming reaction and steam reforming reaction to simultaneously occur in the reformer section of the external reformer, and heat generation in partially oxidizing reacting areas inside the reformer section is able to be absorbed in steam reforming reaction areas, with the exhaust gases from the reformer section being similarly able to contain CO and $H_2$.

That is, with the structure of the presently filed embodiment, due to a capability of controlling any of complete combustion reaction, partially oxidizing reaction, steam reforming reaction and ATR reaction, shortening of the start-up time interval can be realized and the temperatures of the external reformer and the fuel cell stack can be kept constant without depending on the electric power output. Therefore, even if fluctuation occurs in the demanded electric power output due to load variations, the electric power output can be controlled in compliance with such fluctuation.

Further, due to an ability of precluding the temperatures of the external reformer and the fuel cell stack from dropping in a case of temporarily turning off the electric power output, the fuel cell stack has a favorable response during re-start of electric power generation and, in addition, fuel reforming can be performed by the reformer section of the external reformer. Thus, in a case of using hydrocarbon fuels such as natural gas and gasoline, it is possible to preclude the fuel electrode layer of the electric power generating cell section of the fuel cell stack from being deteriorated due to deposition of carbon.

Furthermore, the air heat exchanger section of the external reformer has a function to heat air with heat of the exhaust gas combustion section of the fuel cell stack and enables air, which is heat exchanged and heated, to be introduced into the air flow passage of the exhaust gas combustion section of the fuel cell stack, enabling the exhaust gas combustion section of the fuel cell stack to be heated.

Moreover, the electric power generating cell section of the fuel cell stack is constructed of the fuel electrode layer, the electrolyte layer and the air electrode layer in a structure wherein exhaust gases (reformed fuel gas) and water (steam), emitted from the reformer section of the external reformer, are introduced into the fuel gas flow passage through which fuel gas flows to the fuel electrode layers while exhaust gases in the fuel gas flow passage of the electric power generating cell section pass through the exhaust gas combusting section located in contact with the electric power generating cell section and are exhausted to the outside. Here, not only the fuel gas flow passage of the electric power generating cell section but also the delivery pipe that supplies air are connected to the exhaust gas combusting section, of the fuel cell stack, which is able to allow unburned fuel gas to be combusted in the electric power generating cell section through control of the supply rate of air in the exhaust gas combusting section of the fuel cell stack, with resulting combustion heat enabling the electric power generating cell section to be heated to retain the temperature thereof.

Besides, with the solid electrolyte-type fuel cell, since the electric power generation operating temperature remains at a high level (of more than 400° C.), by introducing fuel and water (steam) into the fuel electrode layers of the electric power generating cell section, it becomes possible for the fuel electrode layers with the reforming functions to perform oxidizing reaction followed by electric power generation while causing steam reforming reaction.

Further, an alternative structure may be constructed wherein the internal reformer section is separately disposed in contact with the electric power generating cell section, thereby enabling an efficiency of reforming reaction to be improved. Particularly, such a structure is favorable when using fuel with a high concentration of carbon molecules, such as natural gas and gasoline, as fuel.

Thus, by forming the internal reformer section in the fuel cell stack, it becomes possible to preclude the fuel electrode layers of the electric power generating cell section from being deposited with carbon, resulting in a capability of avoiding reduction in the power output. Upon provision of the internal reformer section in the vicinity of the electric power generating section, controlling the amount of steam to be introduced into the internal reformer section to achieve steam reforming, which is endothermic reaction, enables cooling control of the electric power generating cell section to be easily performed that is able to prevent abnormal temperature of the fuel cell stack with consequence of an excellent durability.

Furthermore, the water supply source of the electric power generating apparatus is constructed of the water supply tank, the pump and the condenser that condenses and separates steam from the exhaust gases, and actuating the pump and the flow control vales allows water to be supplied to the external reformer and the fuel cell stack from the water supply tank at desired flow rates, respectively.

In such a manner, by supplying water (steam) required for steam reforming reaction to the reformer section of the external reformer and the fuel flow passage of the fuel cell stack, the fuel cell stack can be retained at an appropriate temperature and, in addition, it becomes possible to allow steam reforming reaction to simultaneously take place in both the reformer section of the external reformer and the fuel cell stack. Thus, even if fluctuation occurs in the electric power output when using hydrocarbon fuel such as gasoline, it becomes possible to prevent deterioration, which would be caused by carbon deposited on the electric power generating cell section of the fuel cell stack, in the electric power.

Moreover, in connection with a structure wherein fuel gas, air and water (steam) are introduced into the reformer section of the external reformer while the ratio of the gas, to be introduced depending on the complete combustion reaction mode and the reforming reaction mode, is controlled, the mixing and vaporizing section is located at the fuel gas inlet port of the reformer section and has a function to promote mixing between fuel gas, air and water (steam) for adequate vaporization. This results in a capability of further increasing a reaction efficiency in the reformer section of the external reformer and, also, provision of further improved uniformity in reaction in the reformer section suppresses non-uniform heat generation, thereby enabling provision of a fuel cell system that is further excellent in durability.

Also, in conjunction with a structure wherein water (steam) is newly mixed with fuel gas to be introduced from the reformer section of the external reformer and introduced into the fuel cell stack with the mixing rate of water being controlled depending on the temperature of the external reformer and the operating conditions of the fuel cell stack, the mixing and vaporizing section is located at the fuel gas inlet port of the fuel cell stack and has a function to uniformly mix fuel gas, to be introduced form the external reformer, with water for vaporization. This results in promoted mixing between fuel gas, for electric power generation, and water in the internal reformer section or the electric power generating section inside the fuel cell stack, thereby further achieving improvement over uniformities in reforming reaction or electric power generating reaction. Thus, it becomes possible to further suppress non-uniform heat generation to provide further improved reaction efficiency, while enabling an improvement over durability.

Besides, when introducing fuel gas, water (steam) and air into the reformer section of the external reformer, the ratio of gas to be introduced can be controlled in dependence on the completely combusting reaction mode and the reforming reaction mode. As a result, reaction efficiency in the reformer section of the external reformer can be raised and, also, providing an improved uniform reaction in the reformer section suppresses non-uniform heat generation, thereby enabling provision of a fuel cell system with an excellent durability.

Additionally, when newly mixing water (steam) with fuel gas introduced from the reformer section of the external reformer and introducing a mixture into the fuel cell stack, the mixing rate of water can be controlled depending on the temperature of the external reformer and the operating conditions of the fuel cell stack. That is, since mixing between fuel gas, for electric power generation, and water is promoted in the internal reformer section or the electric power generating section inside the fuel cell stack, improvements over uniformities in reforming reaction or electric power generating reaction can be achieved. Thus, non-uniform heat generation can be restricted to provide improved reaction efficiency, while achieving an improvement over durability.

Further, since air to be used for cooling the fuel cell stack comes to be preheated by the fuel cell stack, this can be used as air for electric power generation. Thus, in a case of using air preheated in the fuel cell stack as air for electric power generation, it becomes possible to achieve electric power generation with no undesired thermal shocks being affected on the electric power generating cell section, thereby enabling provision of a fuel cell system with an excellent durability.

(Second Embodiment)

Next, an electric power generating apparatus and its related method of a second embodiment according to the present invention are described in detail with reference to FIGS. 3 to 4B.

Figure 3:
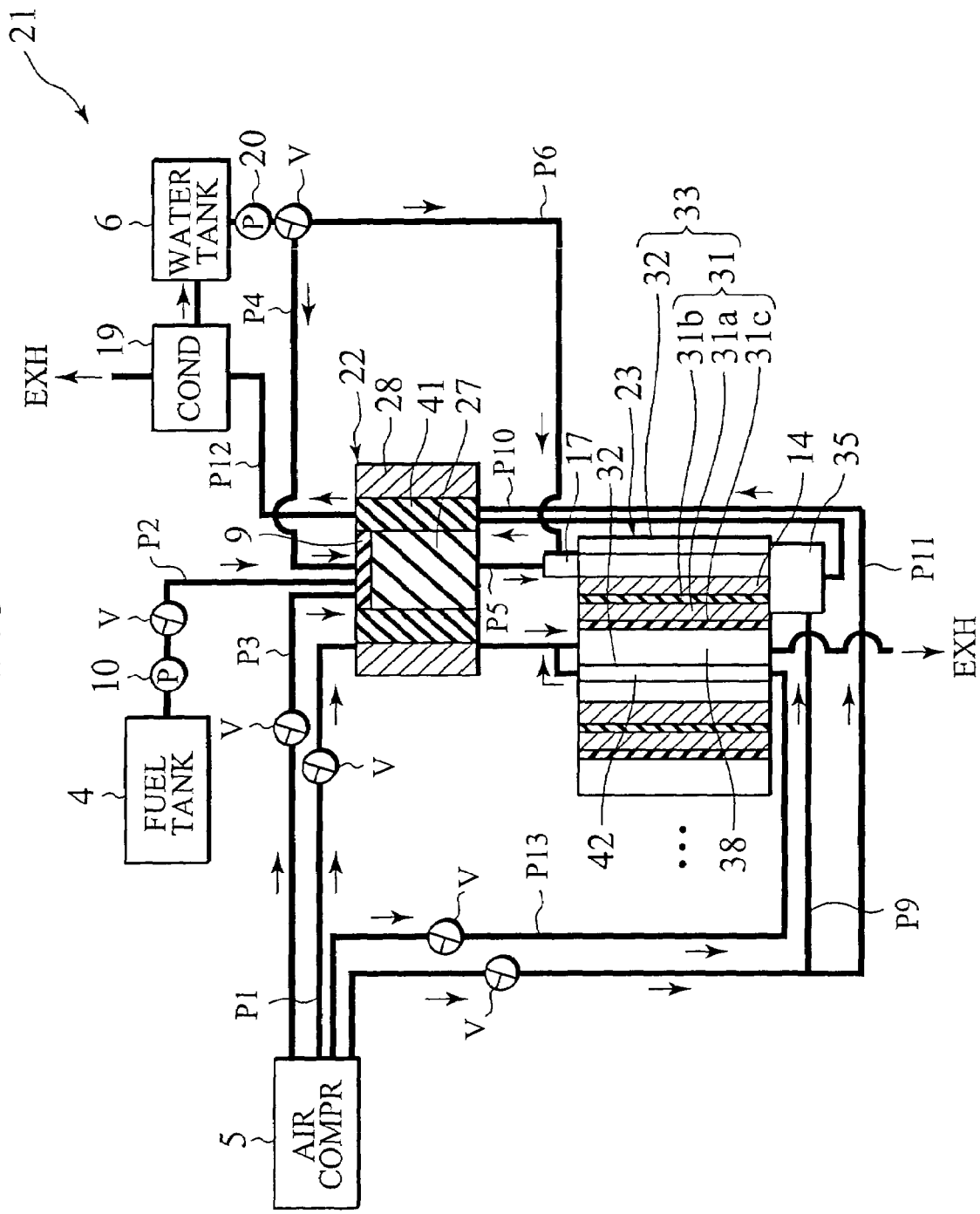
FIG. 3 is a view illustrating a structure of an electric power generating apparatus of a second embodiment according to the present invention.

FIG. 3 is a view illustrating a structure of the electric power generating apparatus of the presently filed embodiment.

As shown in FIG. 3, the second embodiment differs in structure from the first embodiment in that, in an electric power generating apparatus 21 of the presently filed embodiment, a layer of an exhaust gas combusting section 41 is interposed between a reformer section 27 and a heat exchanger section 28 of an external reformer 22 disposed upstream of a fuel cell stack 23 to provide a triplex tubular structure and is similar in other structure to those of the first embodiment. Also, the presently filed embodiment is described aiming at such a differing point, and illustration and description of the same component parts as those of the first embodiment are suitably simplified or omitted.

More particularly, by connecting a delivery pipe P10 leading from an exhaust gas combusting section 35 of the fuel cell stack 23 and a delivery pipe P11 leading from the air compressor 5 to the exhaust gas combusting section 41 of the external reformer 22, unburned fuel gas, which is not used for electric power generation in an electric power generating cell section 33, is substantially and completely combusted, with resulting exhaust gases being expelled to a condenser 19 through a delivery pipe P12. In such a case, whether unburned fuel gas expelled from the fuel cell stack 23 is to be combusted in the exhaust gas combusting section 35 of the fuel cell stack 23 or to be combusted in the exhaust gas combusting section 41 of the external reformer 22 is controlled by the flow rate of air to be newly introduced into the respective exhaust gas combusting sections 35, 41.

Meanwhile, the fuel cell stack 23 includes the electric power generating cell sections 33 each of which is comprised of a plurality of stacks of cell plates 31, each including a cell composed of an electrolyte layer 31a serving as a gas barrier formed at both sides thereof with a fuel electrode layer 31b and an air electrode layer 31c, and a separator plate 32. Such a separator plate 32 not only has a function to partition the electric power generating cell sections 33 with respect to one another but also includes a coolant gas flow passage 42. Permitting air from the air compressor 5 to be supplied through a delivery pipe P13 to flow into the coolant gas flow passage 42 of the separator plate 32, with air passing through this coolant gas flow passage 42 and air passing through the heat exchanger section 28 of the external reformer 22 being arranged to flow through an air flow passage 38 of the electric power generating cell sections 33. Also, the exhaust gas combusting section 35, to which the delivery pipe P9 leading from the air compressor 5 is connected, is disposed downstream of the stack portion where the electric power generating cell sections 33 and the internal reformer section 14 are stacked.

Hereinafter, gas control in a series of operation modes of the electric power generating apparatus 21 of the presently filed embodiment is described.

Figure 4A:
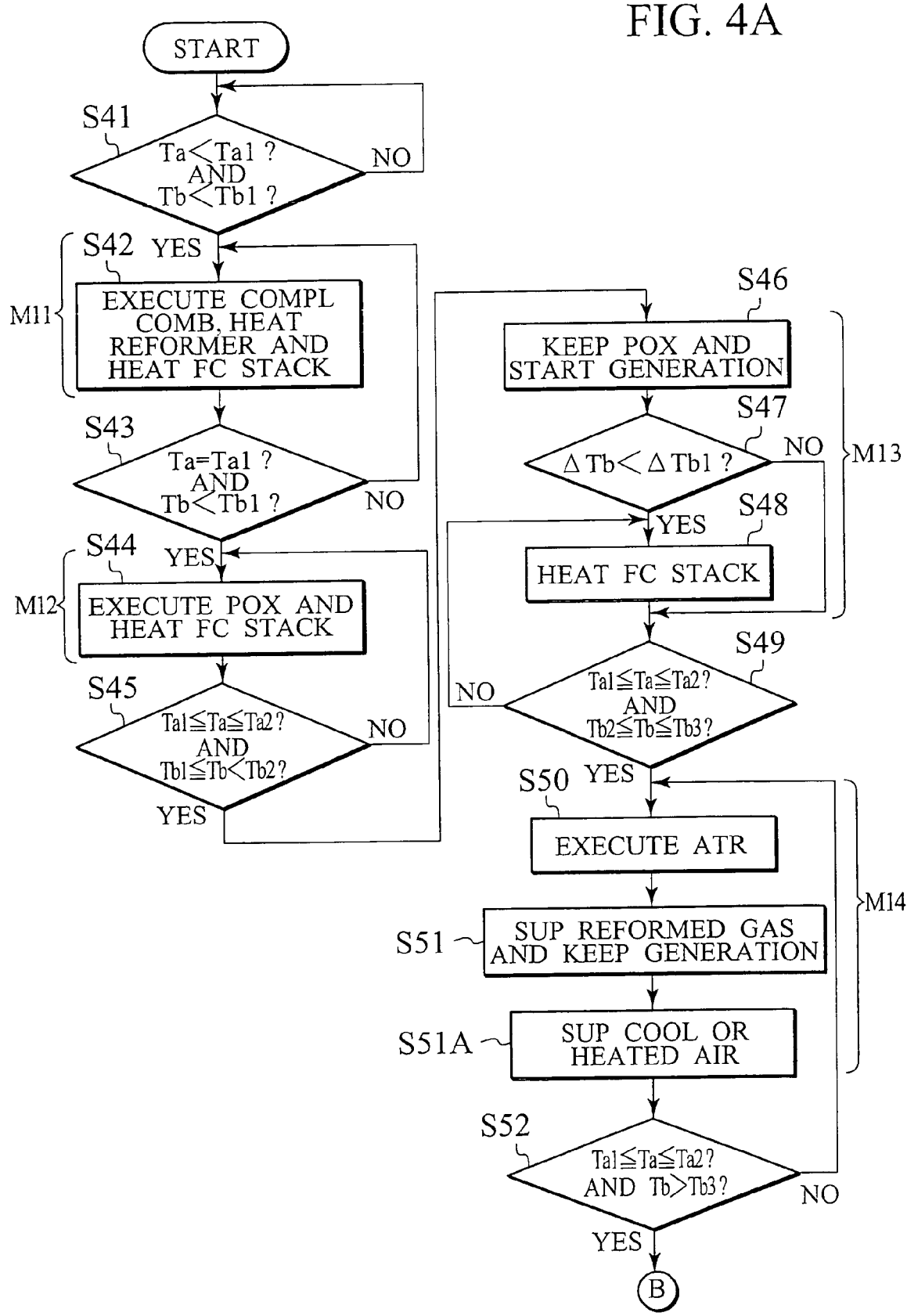
FIGS. 4A and 4B are flowcharts illustrating gas control of the electric power generating apparatus shown in FIG. 3 of the present embodiment.
Figure 4B:
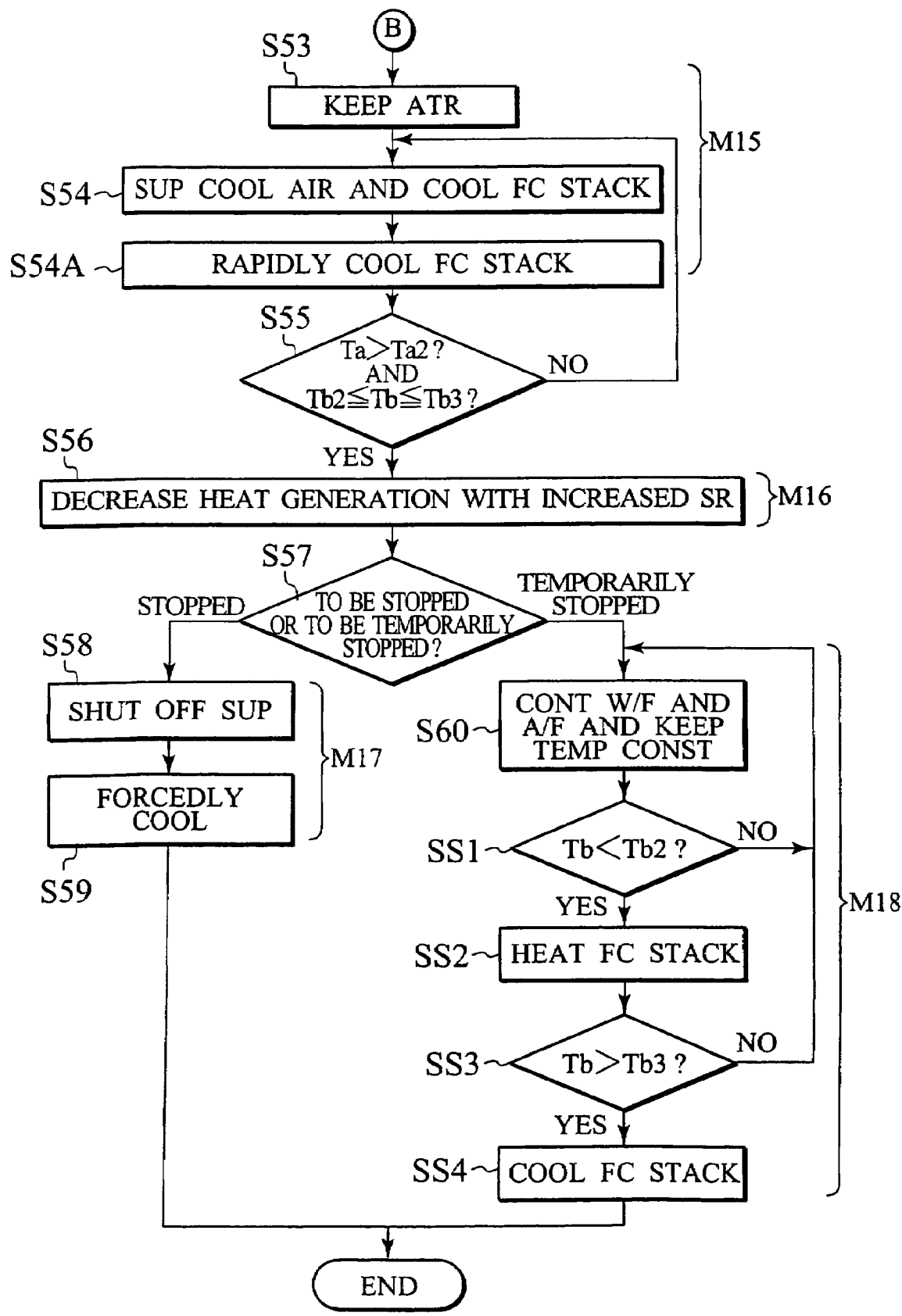

FIGS. 4A and 4B are flowcharts illustrating gas control of the electric power generating apparatus of the presently filed embodiment.

As shown in FIGS. 4A and 4B, in gas control of the presently filed embodiment, also, since a start up mode M11, a stack temperature rising mode M12, a stack temperature rising and electric generation mode M13 and a stop mode M17, that is, steps S41 to S48 and steps S57 to S59 perform the same gas control as that of the start up mode M1, the stack temperature rising mode M2, the stack temperature rising and electric power generation mode M3 and the stop mode M7, that is, steps S1 to S8 and steps S17 to S19, these descriptions are omitted with description of other steps to perform similar operations being suitably simplified or omitted, and description is given mainly for a stack steady state electric power generation mode M14, a stack cooling and electric power generation mode M15, an external reformer cooling electric power generation mode M16 and an electric power output temporary stop mode M18.

Stack Steady State Electric Power Generation Mode M14

With operation routed to step S49, in step S49, if it is judged that the temperature Ta of the reformer section 27 of the external reformer 22 lies in the value equal to or greater than the temperature Ta1, at which partially reforming reaction mode is able to begin, and equal to or less than the durability upper limit temperature Ta2, and the temperature Tb of the electric power generating cell section 13 of the fuel cell stack 3 lies in the value equal to or greater than the steady state electric power generation minimum temperature Tb2 and equal to or less than the steady state electric power generation maximum temperature Tb3, in consecutive step S50, the reformer section 27 of the external reformer 22 shifts from the partially oxidizing mode to the ATR reaction mode and operates, thereby permitting reformed fuel to be continuously introduced into the fuel cell stack 23.

In consecutive step S51, reformed fuel gas expelled from the outlet of the reformer section 27 of the external reformer 22 is introduced into the internal reformer section 14, of the fuel cell stack 23, to which water (steam) is also introduced for performing steam reforming. In the internal reformer section 14 of the fuel cell stack 23, fuel gas, containing large concentration of $H_2$ and CO resulting from steam reforming, is caused to be subjected to oxidizing reaction in the fuel electrode layers 31b of the electric power generating cell sections 33 to achieve electric power generation. Also, fuel gas expelled from the electric power generating cell sections 33 without being consumed therein is introduced into the exhaust gas combusting section 35 to which air is introduced at a desired flow rate for combustion. In such a case, steam reforming reaction in the internal reformer section 14 is an endothermic reaction while any of oxidizing reaction in the electric power generating cell section 33 and combustion in the exhaust gas combusting section 35 are exothermic reactions, and controlling internal reforming reaction based on the amount of steam to be introduced allows the fuel cell stack 23 to be retained at a constant temperature to enable steady state electric power generation.

In succeeding step S51A, although respective heat dissipating properties, which are determined by a heat insulation structure of the external reformer 22 and a heat insulation structure of the fuel cell stack 23 to establish the respective heat balances during the steady state electric power generation mode, additionally, a suitable combination of introducing air, which is introduced into the gas flow passage 42 of the separator plate 32 of the fuel cell stack 23 from the air compressor and preheated, into the air flow passage 38 of the electric power generating cell section 33 of the fuel cell stack 23 and introducing air, which is introduced into the heat exchanger section 28 of the external reformer 22 from the air compressor 5 and preheated, into the air flow passage 28 of the electric power generating cell section 33 of the fuel cell stack 23 allows the fuel cell stack 23 and the external reformer 22 to be more accurately retained at the constant temperature.

That is, in the present mode, the external reformer 22 is typically operated in the ATR mode (with heat being balanced) and heat is dissipated to the outside (to remove heat) whereby the heat balance is established. Also, the fuel cell stack 23 is supplied with reformed fuel gas from the external reformer 22 (to be applied with heat) whereupon internal reforming reaction takes place in the internal reformer section 14 (to remove heat) and electric power generation takes place (to be applied with heat). Then, exhaust gas combustion takes place in the exhaust gas combusting section 35 (to be applied with heat) and heat exchange takes place in the gas flow passage 42 (to remove heat) whereupon heat is dissipated to the outside (to remove heat), thereby establishing the heat balance.

Stack Cooling and Electric Power Generation Mode M15

In succeeding step S52, if it is judged that the temperature Ta of the reformer section 27 of the external reformer 22 lies in the value equal to or greater than the temperature Ta1, at which partially reforming reaction mode is able to begin, and equal to or less than the durability upper limit temperature Ta2 and the temperature Tb of the electric power generating cell section 33 of the fuel cell stack 23 exceeds the steady state electric power generation maximum temperature Tb3, then in consecutive step S53, the reformer section 27 of the external reformer 22 is continuously operated in the ATR reaction mode, thereby introducing reformed fuel gas into the fuel cell stack 23.

In succeeding step S54, among air streams that are introduced into the electric power generating cell section 33 of the fuel cell stack 33, an air stream passing through the heat exchanger 28 of the external reformer 22 and preheated is shut off, with non-preheated air being directly introduced into the electric power generating cell section 33 of the fuel cell stack 23. That is, air, whose temperature is lowered, is introduced into the electric power generating cell section 33 of the fuel cell stack 23 at an increased flow rate, thereby cooling the electric power generating cell section 33.

If further rapid cooling is required, additionally succeeding step S54A, air to be introduced into the exhaust gas combusting section 35 of the fuel cell stack 23 is shut off to allow only unburned fuel gas to pass, and air is introduced into the exhaust gas combusting section 41 of the external reformer 22, thereby combusting unburned fuel gas. At the same time, by increasing the ratio W/F of the amount W of water (steam) to be introduced in terms of the flow rate F of fuel to be introduced into the reformer section 27 of the external reformer 22, steam reforming reaction forming endothermic reaction is increased, thereby lowering the temperature per se of the external reformer 22.

External Reformer Cooling and Electric Power Generation Mode M16

In succeeding step S55, if it is judged that the temperature Ta of the reformer section 27 of the external reformer 22 exceeds the partially reforming upper limit temperature Ta2 and the temperature Tb of the fuel cell stack 23 lies in the value equal to or greater than the steady state electric power generation minimum temperature Tb2 and equal to or less than the steady state electric power generation maximum temperature Tb3, in consecutive step S56, the flow rate of water (steam) to be introduced into the reformer section 27 of the external reformer 22 is increased to allow reaction in the reformer section 27 to be shifted to the reaction mode at an increased steam reforming rate. Here, although the ATR mode is a reaction mode that causes partially reforming reaction and steam reforming reaction, steam reforming reaction, which occurs at the increased rate, forms endothermic reaction and, hence, the temperature of the reformer section 27 is lowered. For this reason, by controlling the ratio W/F of the amount W of water (steam) to be introduced in terms of the flow rate F of fuel gas and the ratio A/F of the flow rate A of air to be introduced in terms of the flow rate F of fuel gas, only the temperature Ta of the reformer section 27 of the external reformer 22 can be regulated.

Electric Power Output Temporary Stop Mode M18

The present mode is similar to that of the first embodiment in that, in step SS1, if it is judged that the temperature Tb of the electric power generating cell section 13 drops below the steady state electric power generating minimum temperature Tb2 because of the shut-off of the electric power output, in succeeding step SS2, the flow rate of fuel gas to be introduced into the reformer section 27 of the external reformer 22 is increased and air is introduced into the exhaust gas combusting section 35 of the fuel cell stack 23 to heat the same. A difference from the first embodiment is that, due to the presence of the exhaust gas combusting section 41 disposed in the external reformer 22, the flow rate of fuel gas to be introduced into the reformer section 27 of the external reformer 22 is increased and, in addition thereto, air to be introduced into the exhaust gas combusting section 41 of the external reformer 22 is shut off. Also, the present mode operations S60, SS3, SS4 are carried out in the same manner as operations S20, S23, and S24 in the first embodiment.

As set forth above, with the structure of the presently filed embodiment, the exhaust gas combusting section is disposed in the vicinity of the reformer section of the external reformer, and the delivery pipe leading from the exhaust gas combusting section of the fuel cell stack and the delivery pipe leading from the air supply source are connected to the exhaust gas combusting section whereupon controlling the amount of air supply allows unburned fuel gas, which is not reacted or combusted in the fuel cell stack or the exhaust gas combusting section thereof, to be combusted. The presently filed embodiment takes the form of a structure in which such combustion heat is transferred to the reformer section of the external reformer whereby, even if operation occurs in the ATR reaction mode or operation occurs in the steam reforming reaction mode, heat can be supplied to the reformer section. Also, due to such exhaust gas combusting section, unburned fuel gas can be substantially and completely combusted and, therefore, it becomes possible to realize effective utilization of heat and purification of exhaust gases.
p Further, since the cooling gas flow passage for cooling the duel cell stack during electric power generation thereof can be formed on an outer circumferential periphery of the electric power generating cell section at a stack portion where the cell plate and the separator are laminated, the cooling gas flow passage can be formed inside the separator and air can be employed as a coolant gas. In such a way, due to the provision of the cooling gas flow passage in the fuel cell stack, even if the temperature of the electric power generating cell section owing to an increase in the electric power output thereof excessively increases, the electric power generating section can be cooled by coolant gas, thereby enabling the electric power generating cell section to be kept at an appropriate temperature optimum for electric power generation. In addition, due to an ability of limiting abnormal increase in the temperature of the fuel cell stack, the fuel cell stack can be satisfactorily protected from being damaged or deteriorated, resulting in a capability of providing a fuel cell system with an excellent durability.

(Third Embodiment)

Next, an electric power generating apparatus and its related method of a third embodiment according to the present invention are described in detail with reference to FIGS. 5 to 6C.

Figure 5:
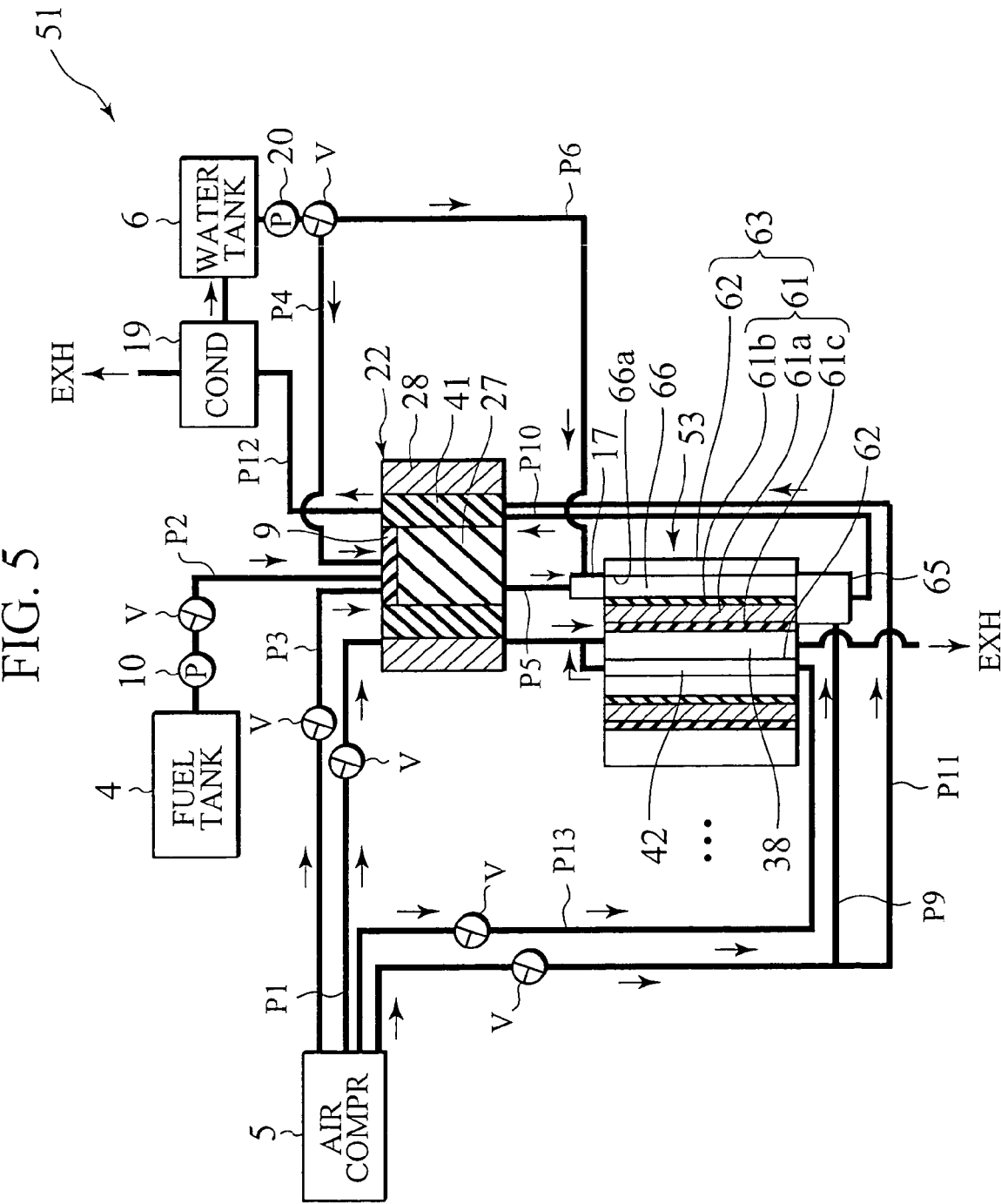
FIG. 5 is a view illustrating a structure of an electric power generating apparatus of a third embodiment according to the present invention.

FIG. 5 is a view illustrating a structure of the electric power generating apparatus of the presently filed embodiment.

As shown in FIG. 5, while an electric power generating apparatus 51 of the presently filed embodiment maintains the structure wherein the exhaust gas combusting section 41 is disposed between the reformer section 27 of the external reformer 22 and the heat exchanger 28, the third embodiment mainly differs in structure from the second embodiment in that the internal reformer section is not disposed in the fuel cell stack 23 and has the same other structure as that of the second embodiment. Also, the presently filed embodiment is described aiming at such a differing point, and illustration and description of the same component parts as those of the second embodiment are suitably simplified or omitted.

More particularly, a fuel cell stack 53 includes an electric power generating cell sections 63 each of which is comprised of a plurality of stacks of cell plates 61, each including a cell composed of an electrolyte layer 61a serving as a gas barrier formed at both sides thereof with a fuel electrode layer 61b and an air electrode layer 61c, and a separator plate 62. Such a separator plate 62 not only has a function to partition the electric power generating cell sections 63 with respect to one another but also includes a coolant gas flow passage 42. However, the fuel cell stack 53 does not include the internal reformer section 14 in the fuel electrode layer 61b of the electric power generating cell section 63.

Further, an exhaust gas combusting section 65, to which the delivery pipe P9 leading from the air compressor 5 is connected, is disposed downstream of the electric power generating cell section 63, and a fuel gas flow passage 66 is arranged to supply fuel gas to the fuel electrode layer 61b with no routing through the internal reformer section. Also, the mixing and vaporizing section 17, to which both the fuel supply delivery pipe P5 leading from the reformer section 27 of the external reformer 22 and the water (steam) supply delivery pipe P6 leading from the water supply tank 6 are connected, is disposed in an inlet port 66a of the fuel gas flow passage 66.

Hereinafter, gas control in a series of operation modes of the electric power generating apparatus 51 of the presently filed embodiment is described.

Figure 6A:
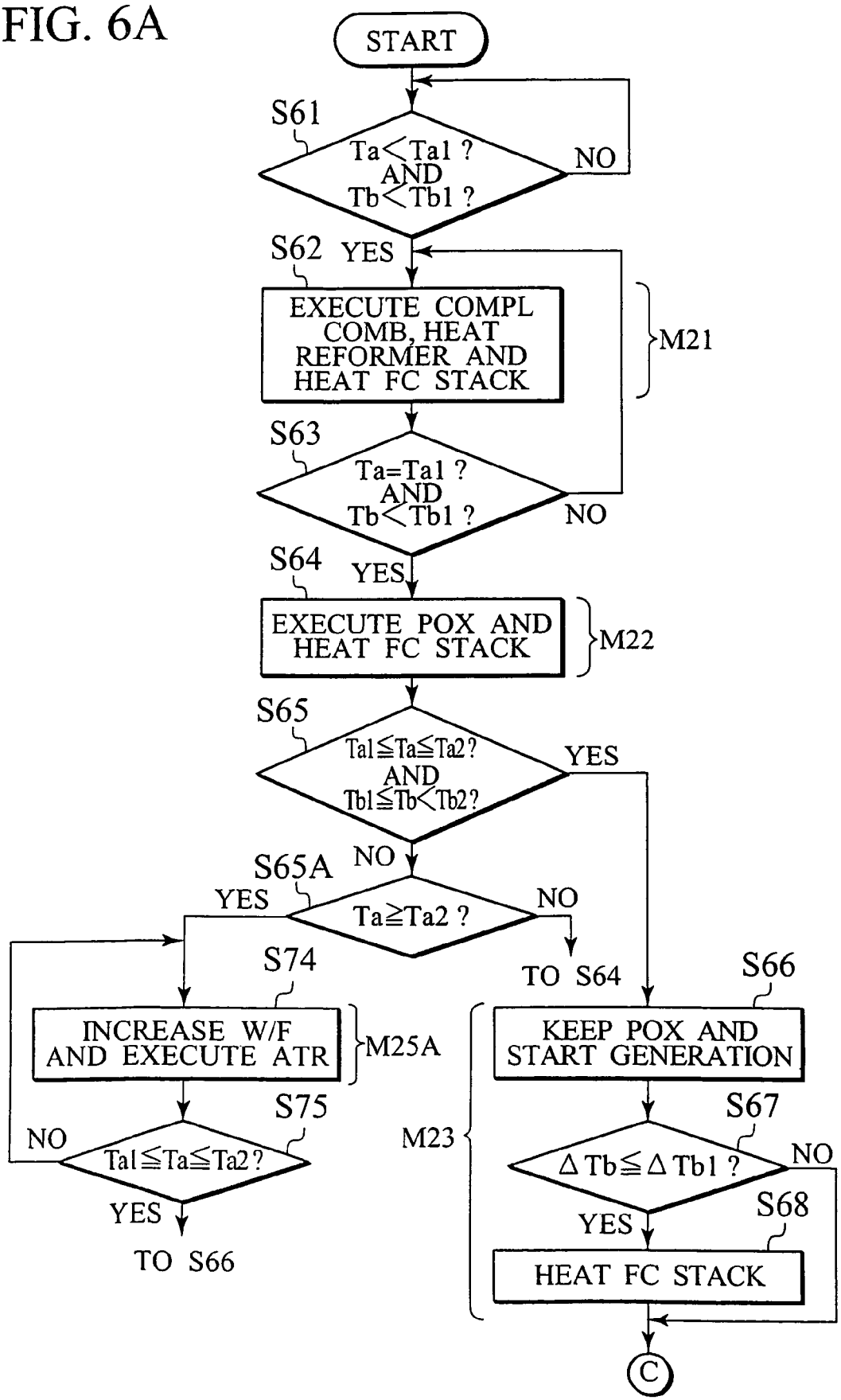
FIGS. 6A to 6C are flowcharts illustrating gas control of the electric power generating apparatus shown in FIG. 5 of the present embodiment.
Figure 6B:
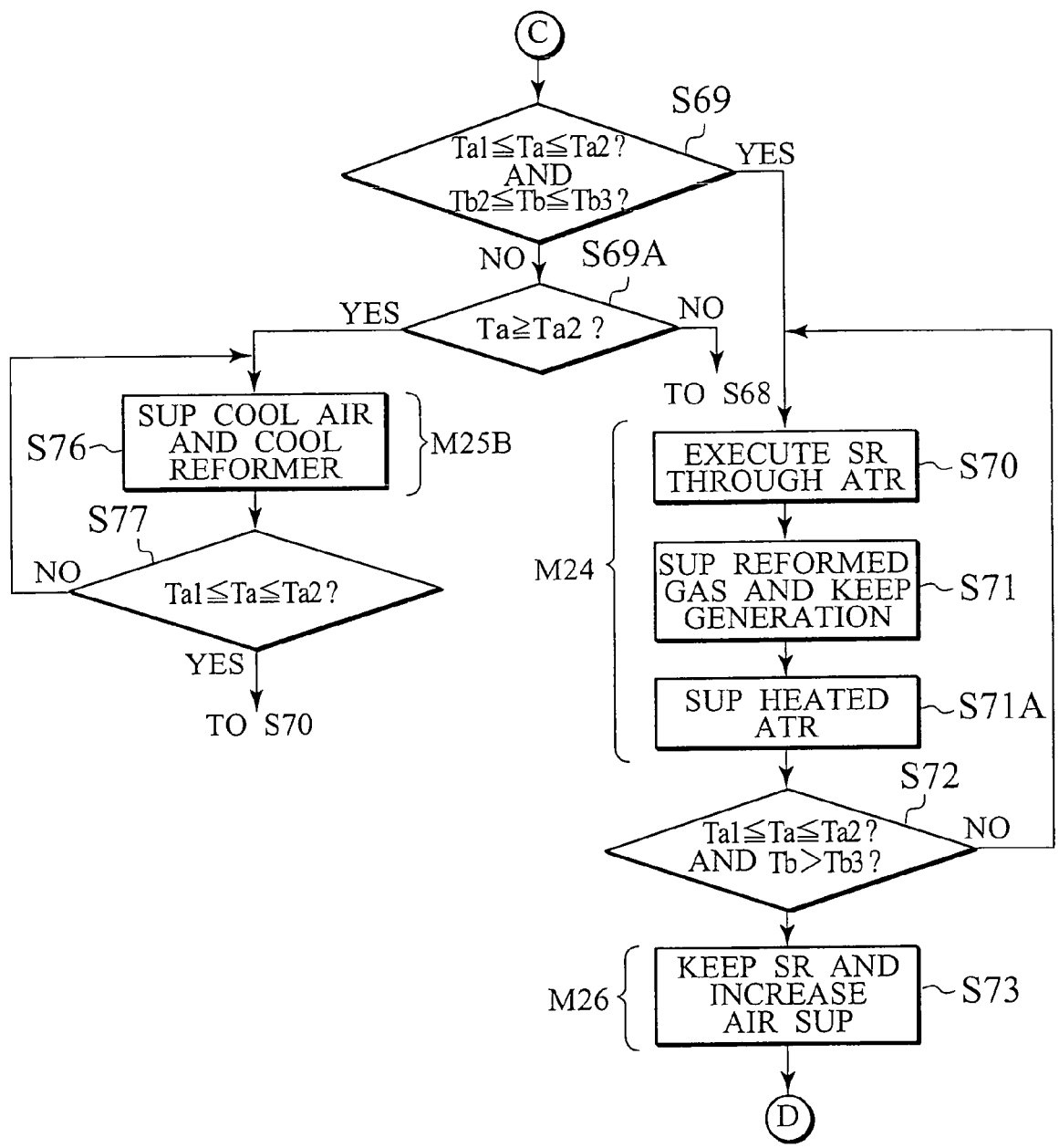
Figure 6C:
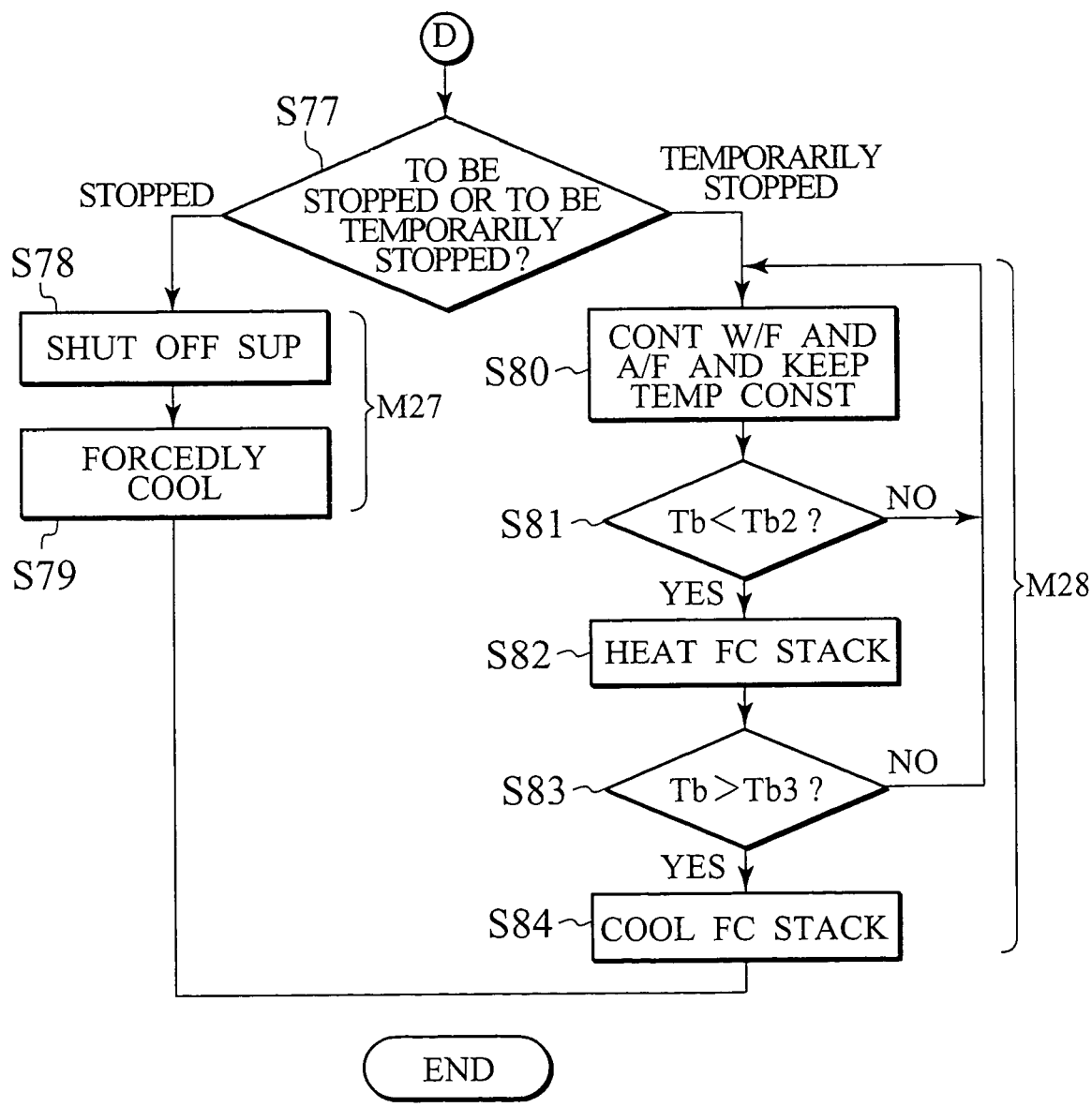

FIGS. 6A to 6C are flowcharts illustrating gas control of the electric power generating apparatus of the presently filed embodiment.

As shown in FIGS. 6A to 6C, in gas control of the presently filed embodiment, also, since a start up mode M21, a stack temperature rising mode M22, a stop mode M27 and an electric power output temporary stop mode M28, that is, steps S61 to S64 and steps S77 to S84 perform the same gas control as that of the start up mode M1, the stack temperature rising mode M2, the stop mode M7 and the electric power output temporary stop mode M8, that is, steps S1 to S4 and steps S17 to S24, these descriptions are omitted with description of other steps to perform similar operations being suitably simplified or omitted, and description is given mainly for a stack temperature rising and electric power generation mode M23, a stack steady state electric power generation mode M24, external reformer cooling mode M25A, external reformer cooling and electric power generation mode M25B, and a stack cooling and electric power generation mode M26. Also, it is supposed that the external reformer cooling mode M25A and the external reformer cooling and electric power generation mode M25B are carried out in the stack temperature rising and electric power generation mode M23 and the stack steady state electric power generation mode M24, respectively.

Stack Temperature Rising and Electric Power Generation Mode M23 and External Reformer Cooling Mode M25A Upon operation routed to step S65, in step S65, if it is judged that the temperature Ta of the reformer section 27 of the external reformer 22 lies in the value equal to or greater than the temperature Ta1, at which partially reforming reaction mode is able to begin, and equal to or less than the durability upper limit temperature Ta2, and the temperature Tb of the electric power generating cell section 63 of the fuel cell stack 53 lies in the value equal to or greater than the temperature Tb1, at which electric power generation is able to begin, and equal to or less than the steady state electric power generation minimum temperature Tb2, flow is routed to step S66 to execute operation for the stack temperature rising and electric power generation mode M23.

In subsequent step S66, the reformer section 27 of the external reformer 22 is continuously operated in the partially reforming reaction mode, with resulting partially reformed fuel gas being introduced into the fuel cell stack 53. Fuel gas introduced into the fuel cell stack 53 reacts with oxygen ions, passing through and supplied through the electrolyte layer 61a, on the surface of the fuel electrode layer 61b of the electric power generating cell section 63 to achieve electric power generation. Further, the electric power output increases with an increase in the temperature Tb of the electric power generating cell section 63, accompanied by an increase in the amount of heat generation in the electric power generating cell section 63. Thus, as the electric power output increases with an increase in the temperature Tb of the electric power generating cell section 63, unburned fuel gas (with carbon containing gas components with no inclusion of $CO_2$) in gases to be introduced into the exhaust gas combusting section 65 from the outlet of the electric power generating cell section 63 of the fuel cell stack 53 decreases.

In consecutive step S67, if it is judged that the rising speed of the temperature Tb of the electric power generating cell section 63 is slow, in succeeding step S68, increasing the flow rate of fuel to be introduced into the reformer section 27 of the external reformer 22 allows an increase in unburned fuel gas that is not consumed in the electric power generating cell section 63 of the fuel cell stack 53, with unburned fuel gas being combusted in the exhaust gas combusting section 65 of the fuel cell stack 53 to heat the electric power generating cell section 63. During such operation, air is introduced from the compressor 5 into the heat exchanger section 28 of the external reformer 22 and is heated, with resulting preheated air being introduced into air flow passage 38 of the electric power generating cell section 63 of the fuel cell stack 53 to heat the same.

Meanwhile, in step S65, if no such conditions described above are satisfied, flow is routed to succeeding step S65A.

In succeeding step S65A, if it is judged that the temperature Ta of the reformer section 27 of the external reformer 22 exceeds the durability upper limit temperature Ta2, this situation represents that abnormal temperature rise occurs in the external reformer 22, flow is routed to consecutive step S74 to execute the external reformer cooling mode M25A prior to operation of the stack temperature rising and electric power generation mode M23.

In consecutive step S74, the ratio W/F of the amount W of water (steam) to be introduced in terms of the flow rate F of fuel gas is increased to allow shift to occur from the partially reforming reaction mode to the ATR reaction, thereby restricting heat generation in the external reformer 22 to lower the temperature.

In consecutive step S75, if it is judged that the temperature Ta of the reformer section 27 of the external reformer 22 lies in the value equal to or greater than the temperature Ta1, at which partially reforming reaction mode is able to begin, and equal to or less than the durability upper limit temperature Ta2, flow is routed to succeeding step S66 to execute operation for the stack temperature rising and electric power generation mode M23. In contrast, if no such judgment is made, flow is routed to step S74. Also, it is not objectionable for operation of the external reformer cooling mode M25A to be executed in the stack temperature rising mode M22.

Stack Steady State Electric Power Generation Mode M24 and External Reformer Cooling and Electric Power Generation Mode M25B In succeeding step S69, if it is judged that the temperature Ta of the reformer section 27 of the external reformer 22 lies in the value equal to or greater than the temperature Ta1, at which partially reforming reaction mode is able to begin, and equal to or less than the durability upper limit temperature Ta2, and the temperature Tb of the electric power generating cell section 63 of the fuel cell stack 53 lies in the value equal to or greater than the steady state electric power generation minimum temperature Tb2 and equal to or less than the steady state electric power generation maximum temperature Tb3, flow is routed to step S70 to execute operation for the stack steady state electric power generation mode M24.

In subsequent step S70, the ratio W/F of the amount W of water (steam) to be introduced in terms of the flow rate F of fuel gas is increased to allow the reformer section 27 of the external reformer 22 to operate in the steam reforming reaction mode subsequent to operation in the ATR reaction mode, thereby obtaining reformed fuel gas with an increased degree in reforming.

In consecutive step S71, the fuel cell stack 53 is supplied with reformed fuel gas introduced from the outlet of the reformer section 27 of the external reformer 22, resulting in continued operation for electric power generation. Also, fuel gas, which is expelled from the electric power generation cell section 63 without being consumed in the electric power generation cell section 63, is combusted in the exhaust gas combusting section 41 of the external reformer 22 to which air is introduced at a desired flow rate.

In subsequent step S71A, air is introduced into the fuel cell stack 53 from the air compressor 5 and preheated by heats in the electric power generating cell section 63 or the exhaust gas combusting section 65 whereupon preheated air is expelled to the outside of the fuel cell stack 53 and then introduced into the air flow passage 38 of the electric power generating cell section 63 of the fuel cell stack 53.

Meanwhile, in step S69, if no such conditions described above are satisfied, flow is routed to succeeding step S69A.

In succeeding step S69A, if it is judged that the temperature Ta of the reformer section 27 of the external reformer 22 exceeds the durability upper limit temperature Ta2, this situation represents that abnormal temperature rise occurs in the external reformer 22, flow is routed to consecutive step S76 to execute the external reformer cooling and electric power generation mode M25B prior to operation of the stack steady state electric power generation mode M24.

In subsequent step S76, air is introduced into the heat exchanger 28 of the external reformer 22 from the air compressor 5 to cool the same.

In succeeding step S77, if it is judged that the temperature Ta of the reformer section 27 of the external reformer 22 lies in a value equal to or greater than the temperature Ta1, at which partially reforming reaction mode is able to begin, and equal to or less than the durability upper limit temperature Ta2, flow is routed to step S70 to execute operation for the stack steady state electric power generation mode M24. In contrast, if no such judgment is made, flow is routed back to step S76.

That is, in the present mode, the external reformer 22 is typically operated in the steam reforming mode (to remove heat), exhaust gas combustion takes place in the exhaust gas combusting section 41 (to apply heat) and heat is dissipated to the outside 9 to remove heat), thereby establishing a heat balance with no occurrence of large heat generation. Also, reformed fuel gas is typically introduced into the fuel cell stack 53 from the external reformer 22 (with substantially less heat being applied), electric power generation takes place (to provide heat), heat exchange occurs in the gas flow passage 42 (to remove heat) and heat is dissipated to the outside to remain in the heat balance.

Stack Cooling and Electric Power Generation Mode M26

In succeeding step S72, if it is judged that the temperature Ta of the reformer section 27 of the external reformer 22 lies in the value equal to or greater than the temperature Ta1, at which partially reforming reaction mode is able to begin, and equal to or less than the durability upper limit temperature Ta2 and the temperature Tb of the electric power generating cell section 63 of the fuel cell stack 53 exceeds the steady state electric power generation maximum temperature Tb3, flow is routed to step S73 to execute the stack cooling and electric power generation mode M26.

In succeeding step S73, the reformer section 27 of the external reformer 22 is continuously operated in the steam reforming mode, and increasing the flow rate of air to be introduced from the compressor 5 into the fuel cell stack 53 cools the electric power generating cell section 63.

Also, it is of course that the external reformer cooling mode M25A and the external reformer cooling and electric power generation mode M25B of the presently filed embodiment may be applied to the first and second embodiments.

As previously described above, in the structure of the presently filed embodiment, while the internal reformer section of the fuel cell stack has been omitted, controlling the respective thermal balances in the external reformer and the fuel ell stack enables the respecting operating modes to be reliably executed.

From the foregoing, in summary, with the respective embodiments set forth above, due to an ability of the fuel cell stack and the external reformer performing respective operations while achieving heat transfers with the outside, respectively, and interactively achieve heat transfers with respect to one another, the external reformer and the fuel cell stack can be quickly heated to be raised to respective temperatures available for electric power generation during the start up, that is, the start-up time can be shortened and, in addition, the external reformer and the fuel cell stack can be retained at the constant temperatures regardless of the electric power output. Thus, even when fluctuation occurs in the demanded electric power output due to occurrence of load variations, the electric power output can be simply and rapidly controlled in compliance with such fluctuation. Thus, even when using hydrocarbon fuel such as natural gas and gasoline, it becomes possible for electric power control to be carried out in a favorable response speed.

The entire content of a Patent Application No. TOKUGAN 2002-243114 with a filing date of Aug. 23, 2002 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An electric power generating apparatus comprising:
   a fuel gas supply source for supplying fuel gas;
   an air supply source for supplying air;
   an external reformer having a reformer section to be supplied with the fuel gas;
   a fuel cell stack having an electric power generating cell section to be supplied with the fuel gas reformed in the reformer section of the external reformer;
   a heat exchanger section disposed on the external reformer for heat exchange between the air supplied from the air supply source and the reformer section, wherein the heat exchanger section is configured to allow the air, passing through the heat exchanger section, to be supplied to the fuel cell stack to perform heat exchange between the air and the fuel cell stack; and
   an exhaust gas combusting section located directly in contact with the electric power generating cell section of the fuel cell stack to permit unburned fuel gas, supplied from the electric power generating cell section, and the air, supplied from the air supply source, to be mixed and combusted to achieve heat exchange with respect to the fuel cell stack.

2. The electric power generating apparatus according to claim 1, wherein the air passing through the heat exchanger section of the external reformer removes heat from the external reformer, and the air passed through the heat exchanger section applies heat to the fuel cell stack.

3. The electric power generating apparatus according to claim 1, wherein the air supplied from the air supply source is directly supplied to the fuel cell stack to remove heat from the fuel cell stack.

4. The electric power generating apparatus according to claim 1, wherein the exhaust gas combusting section of the fuel cell stack applies heat to the fuel cell stack.

5. The electric power generating apparatus according to claim 1, wherein the fuel cell stack includes an internal reformer section disposed in the vicinity of the electric power generating cell section.

6. The electric power generating apparatus according to claim 5, wherein the internal reformer section performs steam reforming to remove heat from the electric power generating cell section.

7. The electric power generating apparatus according to claim 1, further comprising a water supply source for supplying water to the reformer section of the external reformer and the fuel cell stack.

8. The electric power generating apparatus according to claim 1, further comprising a water supply source for supplying water,
wherein a mixing and vaporizing section, which is connected to any of the fuel gas supply source, the air supply source and the water supply source, is disposed at a fuel gas inlet of the reformer section of the external reformer.

9. The electric power generating apparatus according to claim 1, further comprising a water supply source for supplying water,
wherein a mixing and vaporizing section, which is connected to both the fuel gas supply source and the water supply source, is disposed at a fuel gas inlet of the fuel cell stack.

10. The electric power generating apparatus according to claim 1, wherein the external reformer includes another exhaust gas combusting section disposed in the vicinity of the reformer section and connected to a delivery pipe extending from the exhaust gas combusting section of the fuel cell stack and connected to a delivery pipe extending from the air supply source.

11. The electric power generating apparatus according to claim 10, wherein the exhaust gas combusting section of the external reformer is operative when the exhaust gas combusting section of the fuel cell stack is inoperative.

12. The electric power generating apparatus according to claim 1, wherein the fuel cell stack includes a gas flow passage for cooling the fuel cell stack.

13. The electric power generating apparatus according to claim 12, wherein the fuel cell stack comprises a plurality of electric power generating cell sections and a separator that are stacked, wherein the gas flow passage is disposed inside the separator.

14. The electric power generating apparatus according to claim 1, wherein the external reformer and the fuel cell stack each perform heat exchanges with respect to an outside, thereby enabling the external reformer and the fuel cell stack to be heated, to be cooled, or to be retained at a constant temperature.

15. The electric power generating apparatus according to claim 1, wherein the external reformer achieves at least one of a complete combustion reaction, a partially oxidizing reforming reaction, a steam reforming reaction and an auto-thermal reaction.

16. The electric power generating apparatus according to claim 1, further comprising:
a water supply source for supplying water to the reformer section of the external reformer and the fuel cell stack;
a reformer section temperature detector for detecting a temperature of the reformer section of the external reformer;
an electric power generating cell section temperature detector for detecting a temperature of the electric power generating cell section of the fuel cell stack; and
a controller responsive to the temperature of the reformer section detected by the reformer section temperature detector, the temperature of the electric power generating cell section detected by the electric power generating cell section temperature detector and an electric power generating status of the electric power generating cell section,
wherein the controller is configured to control amounts of the fuel gas, the air and the water to be introduced into the external reformer and to control amounts of the air and water to be introduced into the fuel cell stack in order to execute at least one of heating, cooling and retaining the external reformer and the fuel cell stack at constant temperatures.

17. A method of controlling an electric power generating apparatus including a fuel gas supply source for supplying fuel gas, an air supply source for supplying air, an external reformer having a reformer section supplied with the fuel gas, a fuel cell stack having an electric power generating cell section supplied with the fuel gas reformed by the reformer section of the external reformer, a heat exchanger section disposed on the external reformer, and an exhaust gas combusting section located directly in contact with the electric power generating cell section of the fuel cell stack, the method comprising:
achieving heat exchange between air supplied from the air supply source and the reformer section of the external reformer through the heat exchanger section;
supplying the air, subjected to heat exchange made with respect to the reformer section of the external reformer, into the fuel cell stack to perform heat exchange with respect to the fuel cell stack; and
mixing the air, supplied from the air supply source, with unburned fuel gas from the electric power generating cell section of the fuel cell stack to combust the unburned fuel gas and achieving heat exchange with respect to the fuel cell stack through the exhaust gas combusting section located directly in contact with the electric power generating cell section of the fuel cell stack.

* * * * *